United States Patent
Liu et al.

(10) Patent No.: US 10,025,065 B2
(45) Date of Patent: Jul. 17, 2018

(54) OPTICAL IMAGE CAPTURING SYSTEM

(71) Applicant: ABILITY OPTO-ELECTRONICS TECHNOLOGY CO., LTD., Taichung (TW)

(72) Inventors: Yao-Wei Liu, Taichung (TW); Yeong-Ming Chang, Taichung (TW)

(73) Assignee: ABILITY OPTO-ELECTRONICS TECHNOLOGY CO., LTD., Taichung (TW)

( * ) Notice: Subject to any disclaimer, the term of this patent is extended or adjusted under 35 U.S.C. 154(b) by 167 days.

(21) Appl. No.: 14/965,706

(22) Filed: Dec. 10, 2015

(65) Prior Publication Data
US 2016/0334605 A1 Nov. 17, 2016

(30) Foreign Application Priority Data
May 15, 2015 (TW) .............................. 104115583 A

(51) Int. Cl.
G02B 13/18 (2006.01)
G02B 13/00 (2006.01)
G02B 9/16 (2006.01)

(52) U.S. Cl.
CPC ........... *G02B 13/0035* (2013.01); *G02B 9/16* (2013.01)

(58) Field of Classification Search
CPC .... G02B 13/00; G02B 13/001; G02B 13/002; G02B 13/0035
USPC ....... 359/661, 708, 716, 749, 753, 754, 784, 359/785, 790, 192
See application file for complete search history.

(56) References Cited

U.S. PATENT DOCUMENTS

2015/0293370 A1* 10/2015 Suzuki ............... G02B 27/4211
359/570

FOREIGN PATENT DOCUMENTS

| JP | 2010145648 A | 7/2010 |
|---|---|---|
| TW | I475251 B | 3/2015 |
| WO | 2005045500 A1 | 5/2005 |
| WO | 2014041773 A1 | 3/2014 |

OTHER PUBLICATIONS

Examination Report for TW104115583, dated May 16, 2016, Total of 2 pages.
Search Report for TW104115583, dated May 13, 2016, Total of 1 page.
English Abstract for JP2010145648, Total of 1 page.
English Abstract for TWI475251, Total of 1 page.
English Abstract for WO2014041773, Total of 1 page.

* cited by examiner

*Primary Examiner* — Robert E Tallman
(74) *Attorney, Agent, or Firm* — Tracy Heims; Apex Juris, pllc.

(57) ABSTRACT

A three-piece optical lens for capturing image and a three-piece optical module for capturing image, along the optical axis in order from an object side to an image side, include a first lens with positive refractive power, wherein an object-side surface thereof can be convex; a second lens with refractive power; and a third lens with refractive power, wherein both surfaces of each of the aforementioned lenses can be aspheric; the third lens can have positive refractive power, wherein an image-side surface thereof can be concave, and both surfaces thereof are aspheric; at least one surface of the third lens has an inflection point. The optical lens can increase aperture value and improve the imagining quality for use in compact cameras.

24 Claims, 12 Drawing Sheets

OPTICAL IMAGE CAPTURING SYSTEM

The current application claims a foreign priority to application number 104115583 filed on May 15, 2015 in Taiwan.

BACKGROUND OF THE INVENTION

1. Technical Field

The present invention relates generally to an optical system, and more particularly to a compact optical image capturing system for an electronic device.

2. Description of Related Art

In recent years, with the rise of portable electronic devices having camera functionalities, the demand for an optical image capturing system is raised gradually. The image sensing device of ordinary photographing camera is commonly selected from charge coupled device (CCD) or complementary metal-oxide semiconductor sensor (CMOS Sensor). In addition, as advanced semiconductor manufacturing technology enables the minimization of pixel size of the image sensing device, the development of the optical image capturing system towards the field of high pixels. Therefore, the requirement for high imaging quality is rapidly raised.

The conventional optical system of the portable electronic device usually has a two-piece lens. However, the optical system is asked to take pictures in a dark environment, in other words, the optical system is asked to have a large aperture. An optical system with large aperture usually has several problems, such as large aberration, poor image quality at periphery of the image, and hard to manufacture. In addition, an optical system of wide-angle usually has large distortion. Therefore, the conventional optical system provides high optical performance as required.

It is an important issue to increase the quantity of light entering the lens and the angle of field of the lens. In addition, the modern lens is also asked to have several characters, including high pixels, high image quality, small in size, and high optical performance.

BRIEF SUMMARY OF THE INVENTION

The aspect of embodiment of the present disclosure directs to an optical image capturing system and an optical image capturing lens which use combination of refractive powers, convex and concave surfaces of three-piece optical lenses (the convex or concave surface in the disclosure denotes the geometrical shape of an image-side surface or an object-side surface of each lens on an optical axis) to increase the quantity of incoming light of the optical image capturing system, and to improve imaging quality for image formation, so as to be applied to minimized electronic products.

The term and its definition to the lens parameter in the embodiment of the present are shown as below for further reference.

The lens parameter related to a length or a height in the lens:

A height for image formation of the optical image capturing system is denoted by HOI. A height of the optical image capturing system is denoted by HOS. A distance from the object-side surface of the first lens to the image-side surface of the third lens is denoted by InTL. A distance from the image-side surface of the third lens to the image plane is denoted by InB. InTL+InB=HOS. A distance from the first lens to the second lens is denoted by IN12 (instance). A central thickness of the first lens of the optical image capturing system on the optical axis is denoted by TP1 (instance).

The lens parameter related to a material in the lens:

An Abbe number of the first lens in the optical image capturing system is denoted by NA1 (instance). A refractive index of the first lens is denoted by Nd1 (instance).

The lens parameter related to a view angle in the lens:

A view angle is denoted by AF. Half of the view angle is denoted by HAF. A major light angle is denoted by MRA.

The lens parameter related to exit/entrance pupil in the lens:

An entrance pupil diameter of the optical image capturing system is denoted by HEP. For any surface of any lens, a maximum effective half diameter (EHD) is a perpendicular distance between an optical axis and a crossing point on the surface where the incident light with maximum viewing angle of the system passing the very edge of the entrance pupil. For example, the maximum effective half diameter of the object-side surface of the first lens is denoted by EHD11, the maximum effective half diameter of the image-side surface of the first lens is denoted by EHD12, the maximum effective half diameter of the object-side surface of the second lens is denoted by EHD21, the maximum effective half diameter of the image-side surface of the second lens is denoted by EHD22, and so on.

The lens parameter related to an arc length of the shape of a surface and a surface profile:

For any surface of any lens, a profile curve length of the maximum effective half diameter is, by definition, measured from a start point where the optical axis of the belonging optical image capturing system passes through the surface of the lens, along a surface profile of the lens, and finally to an end point of the maximum effective half diameter thereof. In other words, the curve length between the aforementioned start and end points is the profile curve length of the maximum effective half diameter, which is denoted by ARS. For example, the profile curve length of the maximum effective half diameter of the object-side surface of the first lens is denoted by ARS11, the profile curve length of the maximum effective half diameter of the image-side surface of the first lens is denoted by ARS12, the profile curve length of the maximum effective half diameter of the object-side surface of the second lens is denoted by ARS21, the profile curve length of the maximum effective half diameter of the image-side surface of the second lens is denoted by ARS22, and so on.

For any surface of any lens, a profile curve length of a half of the entrance pupil diameter (HEP) is, by definition, measured from a start point where the optical axis of the belonging optical image capturing system passes through the surface of the lens, along a surface profile of the lens, and finally to a coordinate point of a perpendicular distance where is a half of the entrance pupil diameter away from the optical axis. In other words, the curve length between the aforementioned stat point and coordinate point is the profile curve length of a half of the entrance pupil diameter (HEP), and is denoted by ARE. For example, the profile curve length of a half of the entrance pupil diameter (HEP) of the object-side surface of the first lens is denoted by ARE11, the profile curve length of a half of the entrance pupil diameter (HEP) of the image-side surface of the first lens is denoted by ARE12, the profile curve length of a half of the entrance pupil diameter (HEP) of the object-side surface of the second lens is denoted by ARE21, the profile curve length of a half of the entrance pupil diameter (HEP) of the image-side surface of the second lens is denoted by ARE22, and so on.

The lens parameter related to a depth of the lens shape:

A distance in parallel with the optical axis from a maximum effective semi diameter position to an axial point on the object-side surface of the third lens is denoted by InRS31 (instance). A distance in parallel with the optical axis from a maximum effective semi diameter position to an axial point on the image-side surface of the third lens is denoted by InRS32 (instance).

The lens parameter related to the lens shape:

A critical point C is a tangent point on a surface of a specific lens, and the tangent point is tangent to a plane perpendicular to the optical axis and the tangent point cannot be a crossover point on the optical axis. To follow the past, a distance perpendicular to the optical axis between a critical point C21 on the object-side surface of the second lens and the optical axis is HVT21 (instance). A distance perpendicular to the optical axis between a critical point C31 on the object-side surface of the third lens and the optical axis is HVT31 (instance). A distance perpendicular to the optical axis between a critical point C32 on the image-side surface of the third lens and the optical axis is HVT32 (instance). A distance perpendicular to the optical axis between a critical point on the object-side or image-side surface of other lenses the optical axis is denoted in the same manner.

The object-side surface of the third lens has one inflection point IF311 which is nearest to the optical axis, and the sinkage value of the inflection point IF311 is denoted by SGI311 (instance). A distance perpendicular to the optical axis between the inflection point IF311 and the optical axis is HIF311 (instance). The image-side surface of the third lens has one inflection point IF321 which is nearest to the optical axis, and the sinkage value of the inflection point IF321 is denoted by SGI321 (instance). A distance perpendicular to the optical axis between the inflection point IF321 and the optical axis is HIF321 (instance).

The object-side surface of the third lens has one inflection point IF312 which is the second nearest to the optical axis, and the sinkage value of the inflection point IF312 is denoted by SGI312 (instance). A distance perpendicular to the optical axis between the inflection point IF312 and the optical axis is HIF312 (instance). The image-side surface of the third lens has one inflection point IF322 which is the second nearest to the optical axis, and the sinkage value of the inflection point IF322 is denoted by SGI322 (instance). A distance perpendicular to the optical axis between the inflection point IF322 and the optical axis is HIF322 (instance).

The object-side surface of the third lens has one inflection point IF313 which is the third nearest to the optical axis, and the sinkage value of the inflection point IF313 is denoted by SGI313 (instance). A distance perpendicular to the optical axis between the inflection point IF313 and the optical axis is HIF313 (instance). The image-side surface of the third lens has one inflection point IF323 which is the third nearest to the optical axis, and the sinkage value of the inflection point IF323 is denoted by SGI323 (instance). A distance perpendicular to the optical axis between the inflection point IF323 and the optical axis is HIF323 (instance).

The object-side surface of the third lens has one inflection point IF314 which is the fourth nearest to the optical axis, and the sinkage value of the inflection point IF314 is denoted by SGI314 (instance). A distance perpendicular to the optical axis between the inflection point IF314 and the optical axis is HIF314 (instance). The image-side surface of the third lens has one inflection point IF324 which is the fourth nearest to the optical axis, and the sinkage value of the inflection point IF324 is denoted by SGI324 (instance). A distance perpendicular to the optical axis between the inflection point IF324 and the optical axis is HIF324 (instance).

An inflection point, a distance perpendicular to the optical axis between the inflection point and the optical axis, and a sinkage value thereof on the object-side or image-side surface of other lenses is denoted in the same manner.

The lens parameter related to an aberration:

Optical distortion for image formation in the optical image capturing system is denoted by ODT. TV distortion for image formation in the optical image capturing system is denoted by TDT. Further, the range of the aberration offset for the view of image formation may be limited to 50%-100% field. An offset of the spherical aberration is denoted by DFS. An offset of the coma aberration is denoted by DFC.

Transverse aberration on an edge of an aperture is denoted by STA, which stands for STOP transverse aberration, and is used to evaluate the performance of one specific optical image capturing system. The transverse aberration of light in any field of view can be calculated with a tangential fan or a sagittal fan. More specifically, the transverse aberration caused when the longest operation wavelength (e.g., 650 nm) and the shortest operation wavelength (e.g., 470 nm) pass through the edge of the aperture can be used as the reference for evaluating performance. The coordinate directions of the aforementioned tangential fan can be further divided into a positive direction (upper light) and a negative direction (lower light). The longest operation wavelength which passes through the edge of the aperture has an imaging position on the image plane in a particular field of view, and the reference wavelength of the mail light (e.g., 555 nm) has another imaging position on the image plane in the same filed of view. The transverse aberration caused when the longest operation wavelength pass through the edge of the aperture is defined as a distance between these two imaging positions. Similarly, the shortest operation wavelength which passes through the edge of the aperture has an imaging position on the image plane in a particular field of view, and the transverse aberration caused when the shortest operation wavelength pass through the edge of the aperture is defined as a distance between the imaging position of the shortest operation wavelength and the imaging position of the reference wavelength. The performance of the optical image capturing system can be considered excellent if the transverse aberrations of the shortest and the longest operation wavelength which pass through the edge of the aperture and image on the image plane in 0.7 field of view (i.e., 0.7 times the height for image formation HOI) are both less than 20 µm. Furthermore, for a stricter evaluation, the performance cannot be considered excellent unless the transverse aberrations of the shortest and the longest operation wavelength which pass through the edge of the aperture and image on the image plane in 0.7 field of view are both less than 10 µm.

The present invention provides an optical image capturing system, in which the third lens is provided with an inflection point at the object-side surface or at the image-side surface to adjust the incident angle of each view field and modify the ODT and the TDT. In addition, the surfaces of the third lens are capable of modifying the optical path to improve the imagining quality.

The optical image capturing system of the present invention includes a first lens, a second lens, a third lens, and an image plane in order along an optical axis from an object side to an image side. The first lens has refractive power.

Both the object-side surface and the image-side surface of the third lens are aspheric surfaces. The optical image capturing system satisfies:

$1.2 \leq f/HEP \leq 6.0$; $0.5 \leq HOS/f \leq 3.0$; $0 < InTL/HOS < 0.9$;
and $1 \leq 2(ARE/HEP) \leq 1.5$;

where f is a focal length of the optical image capturing system; HEP is an entrance pupil diameter of the optical image capturing system; HOS is a distance in parallel with the optical axis between an object-side surface, which face the object side, of the first lens and the image plane; InTL is a distance between the object-side surface of the first lens and the image-side surface of the third lens on the optical axis; ARE is a profile curve length measured from a start point where the optical axis of the belonging optical image capturing system passes through the surface of the lens, along a surface profile of the lens, and finally to a coordinate point of a perpendicular distance where is a half of the entrance pupil diameter away from the optical axis.

The present invention further provides an optical image capturing system, including a first lens, a second lens, a third lens, and an image plane in order along an optical axis from an object side to an image side. The first lens has positive refractive power, wherein the object-side surface thereof can be convex near the optical axis. The second lens has refractive power. The third lens has negative refractive power, and both the object-side surface and the image-side surface thereof are aspheric surfaces. At least two lenses among the first lens to the third lens respectively have at least an inflection point on at least a surface thereof. At least one lens between the second lens and the third lens has positive refractive power. The optical image capturing system satisfies:

$1.2 \leq f/HEP \leq 6.0$; $0.5 \leq HOS/f \leq 3.0$; $0 < InTL/HOS < 0.9$;
and $1 \leq 2(ARE/HEP) \leq 1.5$;

where f is a focal length of the optical image capturing system; HEP is an entrance pupil diameter of the optical image capturing system; HOS is a distance in parallel with the optical axis between an object-side surface, which face the object side, of the first lens and the image plane; InTL is a distance between the object-side surface of the first lens and the image-side surface of the third lens on the optical axis; ARE is a profile curve length measured from a start point where the optical axis of the belonging optical image capturing system passes through the surface of the lens, along a surface profile of the lens, and finally to a coordinate point of a perpendicular distance where is a half of the entrance pupil diameter away from the optical axis.

The present invention further provides an optical image capturing system, including a first lens, a second lens, a third lens, and an image plane, in order along an optical axis from an object side to an image side. At least one of the object-side surface and the image-side surface of the third lens has at least an inflection point. The number of the lenses having refractive power in the optical image capturing system is three. The first lens and the second lens respectively have at least an inflection point on at least one surface thereof. The first lens has positive refractive power, and the second lens has refractive power. The third lens has negative refractive power, wherein the object-side surface and the image-side surface thereof are both aspheric surfaces. The optical image capturing system satisfies:

$1.2 \leq f/HEP \leq 3.5$; $0.5 \leq HOS/f \leq 3.0$; $0 < InTL/HOS < 0.9$;
and $1 \leq 2(ARE/HEP) \leq 1.5$;

where f is a focal length of the optical image capturing system; HEP is an entrance pupil diameter of the optical image capturing system; HOS is a distance in parallel with the optical axis between an object-side surface, which face the object side, of the first lens and the image plane; InTL is a distance between the object-side surface of the first lens and the image-side surface of the third lens on the optical axis; ARE is a profile curve length measured from a start point where the optical axis of the belonging optical image capturing system passes through the surface of the lens, along a surface profile of the lens, and finally to a coordinate point of a perpendicular distance where is a half of the entrance pupil diameter away from the optical axis.

For any surface of any lens, the profile curve length within the effective half diameter affects the ability of the surface to correct aberration and differences between optical paths of light in different fields of view. With longer profile curve length, the ability of correcting aberration is better. However, the difficulty of manufacturing increases as well. Therefore, the profile curve length within the effective half diameter of any surface of any lens has to be controlled. The ratio between the profile curve length (ARS) within the effective half diameter of one surface and the thickness (TP) of the lens, which the surface belonged to, on the optical axis (i.e., ARS/TP) has to be particularly controlled. For example, the profile curve length of the maximum effective half diameter of the object-side surface of the first lens is denoted by ARS11, the thickness of the first lens on the optical axis is TP1, and the ratio between these two parameters is ARS11/TP1; the profile curve length of the maximum effective half diameter of the image-side surface of the first lens is denoted by ARS12, and the ratio between ARS12 and TP1 is ARS12/TP1. The profile curve length of the maximum effective half diameter of the object-side surface of the second lens is denoted by ARS21, the thickness of the second lens on the optical axis is TP2, and the ratio between these two parameters is ARS21/TP2; the profile curve length of the maximum effective half diameter of the image-side surface of the second lens is denoted by ARS22, and the ratio between ARS22 and TP2 is ARS22/TP2. For any surface of other lenses in the optical image capturing system, the ratio between the profile curve length of the maximum effective half diameter thereof and the thickness of the lens which the surface belonged to is denoted in the same manner.

For any surface of any lens, the profile curve length within a half of the entrance pupil diameter (HEP) affects the ability of the surface to correct aberration and differences between optical paths of light in different fields of view. With longer profile curve length, the ability of correcting aberration is better. However, the difficulty of manufacturing increases as well. Therefore, the profile curve length within a half of the entrance pupil diameter (HEP) of any surface of any lens has to be controlled. The ratio between the profile curve length (ARE) within a half of the entrance pupil diameter (HEP) of one surface and the thickness (TP) of the lens, which the surface belonged to, on the optical axis (i.e., ARE/TP) has to be particularly controlled. For example, the profile curve length of a half of the entrance pupil diameter (HEP) of the object-side surface of the first lens is denoted by ARE11, the thickness of the first lens on the optical axis is TP1, and the ratio between these two parameters is ARE11/TP1; the profile curve length of a half of the entrance pupil diameter (HEP) of the image-side surface of the first lens is denoted by ARE12, and the ratio between ARE12 and TP1 is ARE12/TP1. The profile curve length of a half of the entrance pupil diameter (HEP) of the object-side surface of the second lens is denoted by ARE21, the thickness of the second lens on the optical axis is TP2, and the ratio between these two parameters is ARE21/TP2; the profile curve length of a half of the entrance pupil diameter (HEP) of the image-side surface of the second lens is denoted by ARE22, and the ratio between ARE22 and TP2 is ARE22/TP2. For any surface of other lenses in the optical image capturing system, the ratio between the profile curve length of a half of the entrance pupil diameter (HEP) thereof and the thickness of the lens which the surface belonged to is denoted in the same manner.

In an embodiment, the optical image capturing system further includes an image sensor with a size less than 1/1.2" in diagonal, and a pixel less than 1.4 μm. A preferable pixel size of the image sensor is less than 1.12 μm, and more preferable pixel size is less than 0.9 μm. A 16:9 image sensor is available for the optical image capturing system of the present invention.

In an embodiment, the optical image capturing system of the present invention is available to a million pixels or higher recording, and provides high quality of image.

In an embodiment, a height of the optical image capturing system (HOS) can be reduced while |f1|>f3.

In an embodiment, when the lenses satisfy |f2|>|f1|, the second lens could have weak positive refractive power or weak negative refractive power. When the second lens has weak positive refractive power, it may share the positive refractive power of the first lens, and on the contrary, when the second lens has weak negative refractive power, it may finely modify the aberration of the system.

In an embodiment, the third lens could have positive refractive power, and an image-side surface thereof is concave, it may reduce back focal length and size. Besides, the third lens can have at least an inflection point on at least a surface thereof, which may reduce an incident angle of the light of an off-axis field of view and modify the aberration of the off-axis field of view.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1A:
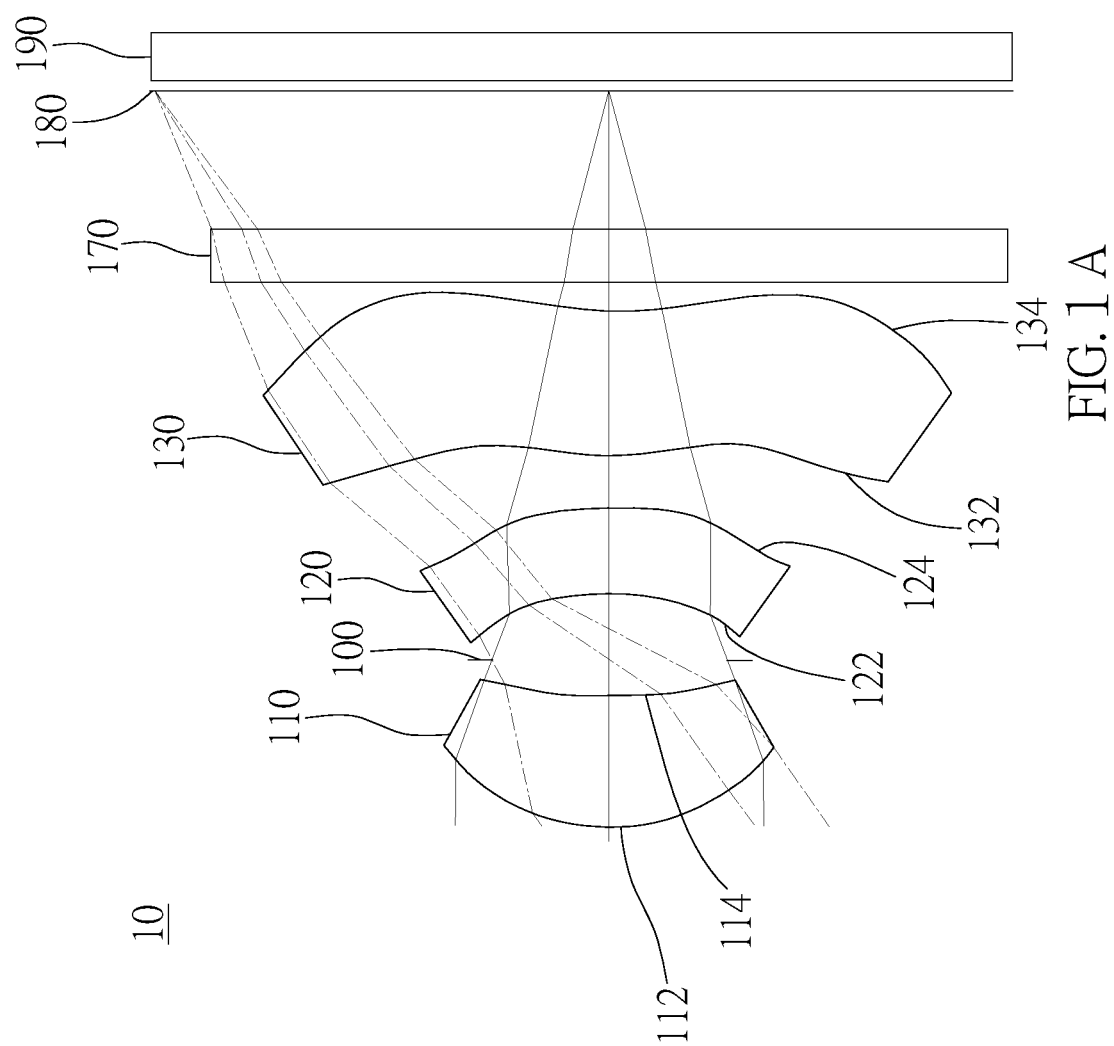
FIG. 1A is a schematic diagram of a first embodiment of the present invention.
Figure 1:
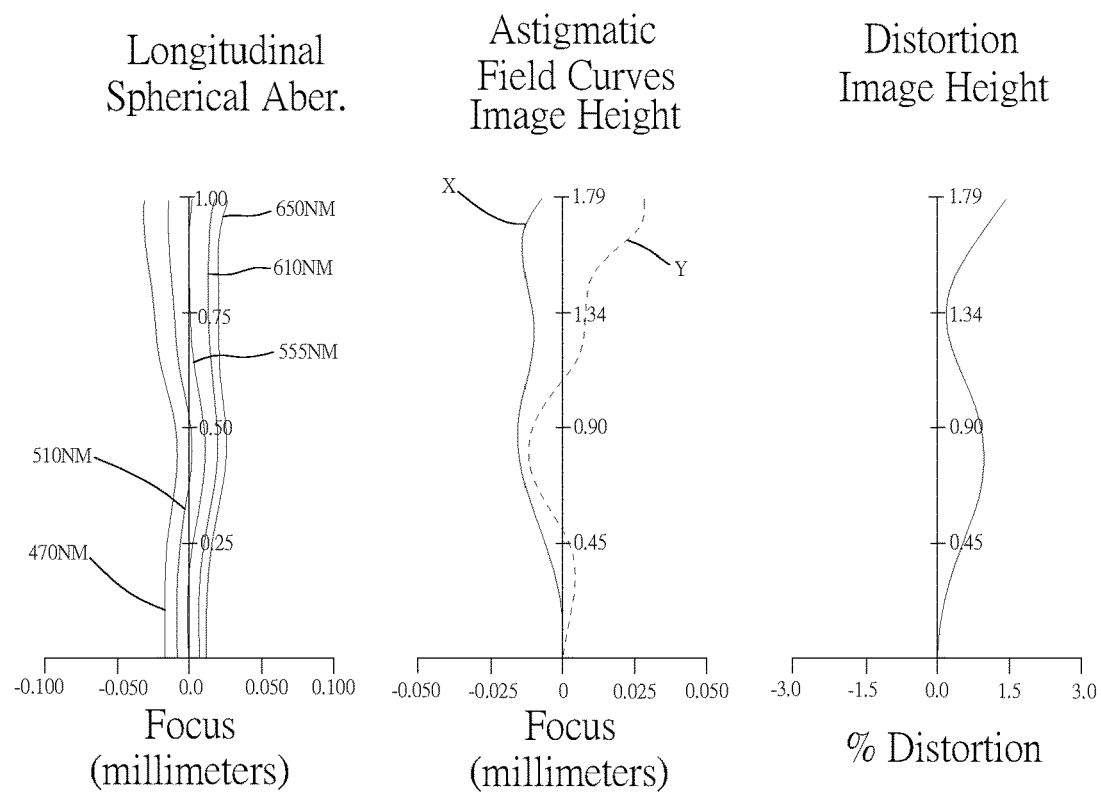
FIG. 1B shows curve diagrams of longitudinal spherical aberration, astigmatic field, and optical distortion of the optical image capturing system in the order from left to right of the first embodiment of the present application.
FIG. 1C shows a tangential fan and a sagittal fan of the optical image capturing system of the first embodiment of the present application, and a transverse aberration diagram at 0.7 field of view when a longest operation wavelength and a shortest operation wavelength pass through an edge of an aperture.
Figure 1:
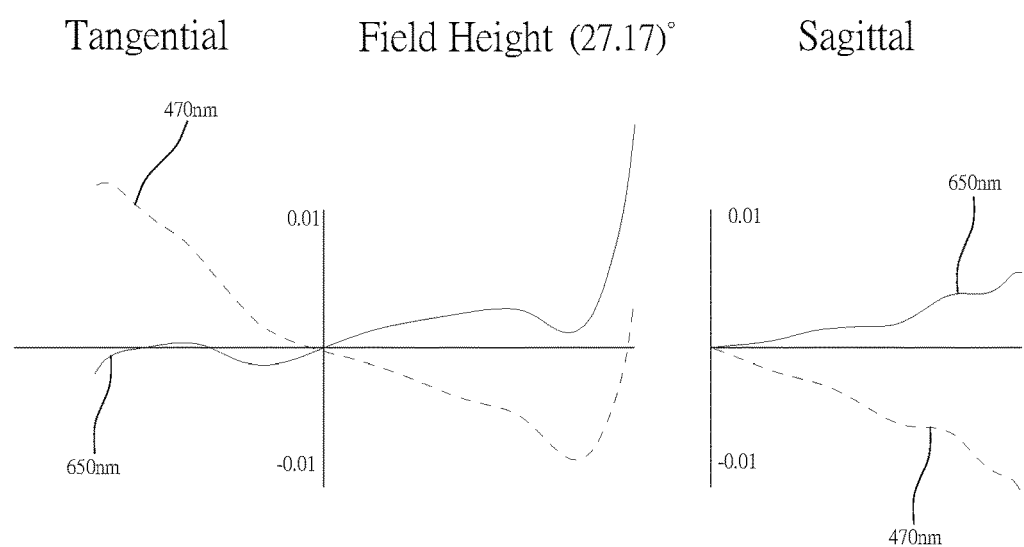

An optical image capturing system of the present invention includes a first lens, a second lens, and a third lens from an object side to an image side. The optical image capturing system further is provided with an image sensor at an image plane.

The optical image capturing system works in three wavelengths, including 470 nm, 510 nm, 555 nm, and 610 nm, wherein 555 nm is the main reference wavelength, and is the reference wavelength for obtaining the technical characters.

For calculation related to retrieving the transvers aberration when the longest operation wavelength and the shortest operation wavelength pass through the edge of the aperture, the longest operation wavelength is 650 nm, the reference wavelength of main light is 555 nm, and the shortest operation wavelength is 470 nm.

The optical image capturing system of the present invention satisfies $0.5 \leq \Sigma PPR/|\Sigma NPR| \leq 4.5$, and a preferable range is $1 \leq \Sigma PPR/|\Sigma NPR| \leq 3.8$, where PPR is a ratio of the focal length f of the optical image capturing system to a focal length fp of each of lenses with positive refractive power; NPR is a ratio of the focal length f of the optical image capturing system to a focal length fn of each of lenses with negative refractive power; $\Sigma PPR$ is a sum of the PPRs of each positive lens; and $\Sigma NPR$ is a sum of the NPRs of each negative lens. It is helpful for control of an entire refractive power and an entire length of the optical image capturing system.

HOS is a height of the optical image capturing system, and when the ratio of HOS/f approaches to 1, it is helpful for decrease of size and increase of imaging quality.

In an embodiment, the optical image capturing system of the present invention satisfies $0 < \Sigma PP \leq 200$ and $f1/\Sigma PP \leq 0.85$, and a preferable range is $0 < \Sigma PP \leq 150$ and $0.01 \leq f1/\Sigma PP \leq 0.6$, where $\Sigma PP$ is a sum of a focal length fp of each lens with positive refractive power, and $\Sigma NP$ is a sum of a focal length fn of each lens with negative refractive power. It is helpful for control of focusing capacity of the system and redistribution of the positive refractive powers of the system to avoid the significant aberration in early time.

The first lens has positive refractive power, and an object-side surface, which faces the object side, thereof can be convex. It may modify the positive refractive power of the first lens as well as shorten the entire length of the system.

The second lens has negative refractive power, which may correct the aberration of the first lens.

The third lens has positive refractive power, and an image-side surface, which faces the image side, thereof can be concave. It may share the positive refractive power of the first lens and shorten the back focal length to keep the system miniaturized. Besides, the third has at least an inflection point on at least a surface thereof to reduce the incident angle of the off-axis view angle light. Preferably, both the object-side surface and the image-side surface respectively have at least an inflection point.

The image sensor is provided on the image plane. The optical image capturing system of the present invention satisfies $HOS/HOI \leq 3$ and $0.5 \leq HOS/f \leq 3.0$, and a preferable range is $1 \leq HOS/HOI \leq 2.5$ and $1 \leq HOS/f \leq 2$, where HOI is a half of a diagonal of an effective sensing area of the image sensor, i.e., the maximum image height, and HOS is a height of the optical image capturing system, i.e. a distance on the optical axis between the object-side surface of the first lens and the image plane. It is helpful for reduction of size of the system for used in compact cameras.

The optical image capturing system of the present invention further is provided with an aperture to increase image quality.

In the optical image capturing system of the present invention, the aperture could be a front aperture or a middle aperture, wherein the front aperture is provided between the object and the first lens, and the middle is provided between the first lens and the image plane. The front aperture provides a long distance between an exit pupil of the system and the image plane, which allows more elements to be installed. The middle could enlarge a view angle of view of the system and increase the efficiency of the image sensor. The optical image capturing system satisfies $0.5 \leq InS/HOS \leq 1.1$, and a preferable range is $0.6 \leq InS/HOS \leq 1$, where InS is a distance between the aperture and the image plane. It is helpful for size reduction and wide angle.

The optical image capturing system of the present invention satisfies $0.45 \leq \Sigma TP/InTL \leq 0.95$, where InTL is a distance between the object-side surface of the first lens and the image-side surface of the third lens, and $\Sigma TP$ is a sum of central thicknesses of the lenses on the optical axis. It is helpful for the contrast of image and yield rate of manufacture, and provides a suitable back focal length for installation of other elements.

The optical image capturing system of the present invention satisfies $0.1 \leq |R1/R2| \leq 3.0$, and a preferable range is $0.1 \leq |R1/R2| \leq 2.0$, where R1 is a radius of curvature of the object-side surface of the first lens, and R2 is a radius of curvature of the image-side surface of the first lens. It provides the first lens with a suitable positive refractive power to reduce the increase rate of the spherical aberration.

The optical image capturing system of the present invention satisfies $-200 < (R5-R6)/(R5+R6) < 30$, where R5 is a radius of curvature of the object-side surface of the third lens, and R6 is a radius of curvature of the image-side surface of the third lens. It may modify the astigmatic field curvature.

The optical image capturing system of the present invention satisfies $0 < IN12/f \leq 0.30$, and a preferable range is $0.01 \leq IN12/f \leq 0.25$, where IN12 is a distance on the optical axis between the first lens and the second lens. It may correct chromatic aberration and improve the performance.

The optical image capturing system of the present invention satisfies $0 < IN23/f \leq 0.25$, where IN23 is a distance on the optical axis between the second lens and the third lens. It may correct chromatic aberration and improve the performance.

The optical image capturing system of the present invention satisfies $2 \leq (TP1+IN12)/TP2 \leq 10$, where TP1 is a central thickness of the first lens on the optical axis, and TP2 is a central thickness of the second lens on the optical axis. It may control the sensitivity of manufacture of the system and improve the performance.

The optical image capturing system of the present invention satisfies $1.0 \leq (TP3+IN23)/TP2 \leq 10$, where TP2 is a central thickness of the second lens on the optical axis, TP3 is a central thickness of the third lens on the optical axis, and IN23 is a distance between the second lens and the third lens. It may control the sensitivity of manufacture of the system and improve the performance.

The optical image capturing system of the present invention satisfies $0.1 \leq TP1/TP2 \leq 0.6$; $0.1 \leq TP2/TP3 \leq 0.6$, where TP1 is a central thickness of the first lens on the optical axis, TP2 is a central thickness of the second lens on the optical axis, and TP3 is a central thickness of the third lens on the optical axis. It may finely modify the aberration of the incident rays layer by layer, and reduce the height of the system.

The optical image capturing system of the present invention satisfies $-1 \text{ mm} \leq InRS31 \leq 1 \text{ mm}$; $-1 \text{ mm} \leq InRS32 \leq 1 \text{ mm}$; $1 \text{ mm} \leq |InRS31|+|InRS32| \leq 2 \text{ mm}$; $0.01 \leq |InRS31|/TP3 \leq 10$; $0.01 \leq |InRS32|/TP3 \leq 10$, where InRS31 is a displacement in parallel with the optical axis from a point on the object-side surface of the third lens, through which the optical axis passes, to a point at the maximum effective semi diameter of the object-side surface of the third lens, wherein InRS31 is positive while the displacement is toward the image side, and InRS31 is negative while the displacement is toward the object side; InRS32 is a displacement in parallel with the optical axis from a point on the image-side surface of the third lens, through which the optical axis passes, to a point at the maximum effective semi diameter of the image-side surface of the third lens; and TP3 is a central thickness of the third lens on the optical axis. It may control the positions of the maximum effective semi diameter on both surfaces of the third lens, correct the aberration of the peripheral view field, and reduce the size.

The optical image capturing system of the present invention satisfies 0<SGI311/(SGI311+TP3)≤0.9; 0<SGI321/(SGI321+TP3)≤0.9, and it is preferable to satisfy 0.01<SGI311/(SGI311+TP3)≤0.7; 0.01<SGI321/(SGI321+TP3)≤0.7, where SGI311 is a displacement in parallel with the optical axis, from a point on the object-side surface of the third lens, through which the optical axis passes, to the inflection point on the object-side surface, which is the closest to the optical axis, and SGI321 is a displacement in parallel with the optical axis, from a point on the image-side surface of the third lens, through which the optical axis passes, to the inflection point on the image-side surface, which is the closest to the optical axis.

The optical image capturing system of the present invention satisfies 0<SGI312/(SGI312+TP3)≤0.9; 0<SGI322/(SGI322+TP3)≤0.9, and it is preferable to satisfy 0.1≤SGI312/(SGI312+TP3)≤0.8; 0.1≤SGI322/(SGI322+TP3)≤0.8, where SGI312 is a displacement in parallel with the optical axis, from a point on the object-side surface of the third lens, through which the optical axis passes, to the inflection point on the object-side surface, which is the second closest to the optical axis, and SGI322 is a displacement in parallel with the optical axis, from a point on the image-side surface of the third lens, through which the optical axis passes, to the inflection point on the image-side surface, which is the second closest to the optical axis.

The optical image capturing system of the present invention satisfies 0.01≤HIF311/HOI≤0.9; 0.01≤HIF321/HOI≤0.9, and it is preferable to satisfy 0.09≤HIF311/HOI≤0.5; 0.09≤HIF321/HOI≤0.5, where HIF311 is a distance perpendicular to the optical axis between the inflection point on the object-side surface of the third lens, which is the closest to the optical axis, and the optical axis, and HIF321 is a distance perpendicular to the optical axis between the inflection point on the image-side surface of the third lens, which is the closest to the optical axis, and the optical axis.

The optical image capturing system of the present invention satisfies 0.01≤HIF312/HOI≤0.9; 0.01≤HIF322/HOI≤0.9, and it is preferable to satisfy 0.09≤HIF312/HOI≤0.8; 0.09≤HIF322/HOI≤0.8, where HIF312 is a distance perpendicular to the optical axis between the inflection point on the object-side surface of the third lens, which is the second closest to the optical axis, and the optical axis, and HIF322 is a distance perpendicular to the optical axis between the inflection point on the image-side surface of the third lens, which is the second closest to the optical axis, and the optical axis.

The optical image capturing system of the present invention satisfies 0.001 mm≤|HIF313|≤5 mm; 0.001 mm≤|HIF323|≤5 mm, and it is preferable to satisfy 0.1 mm≤|HIF323|≤3.5 mm; 0.1 mm≤|HIF313|≤3.5 mm, where HIF313 is a distance perpendicular to the optical axis between the inflection point on the object-side surface of the third lens, which is the third closest to the optical axis, and the optical axis, and HIF323 is a distance perpendicular to the optical axis between the inflection point on the image-side surface of the third lens, which is the third closest to the optical axis, and the optical axis.

The optical image capturing system of the present invention satisfies 0.001 mm≤|HIF314|≤5 mm; 0.001 mm≤|HIF324|≤5 mm, and it is preferable to satisfy 0.1 mm≤|HIF324|≤3.5 mm; 0.1 mm≤|HIF314|≤3.5 mm, where HIF314 is a distance perpendicular to the optical axis between the inflection point on the object-side surface of the third lens, which is the fourth closest to the optical axis, and the optical axis, and HIF324 is a distance perpendicular to the optical axis between the inflection point on the image-side surface of the third lens, which is the fourth closest to the optical axis, and the optical axis.

In an embodiment, the lenses of high Abbe number and the lenses of low Abbe number are arranged in an interlaced arrangement that could be helpful for correction of aberration of the system.

An equation of aspheric surface is $$z=ch^2/[1+[1(k+1)c^2h^2]^{0.5}]+A4h^4+A6h^6+A8h^8+ A10h^{10}+A12h^{12}+A14h^{14}+A16h^{16}+A18h^{18}+ A20h^{20}+\ldots \qquad (1)$$

where z is a depression of the aspheric surface; k is conic constant; c is reciprocal of radius of curvature; and A4, A6, A8, A10, A12, A14, A16, A18, and A20 are high-order aspheric coefficients.

In the optical image capturing system, the lenses could be made of plastic or glass. The plastic lenses may reduce the weight and lower the cost of the system, and the glass lenses may control the thermal effect and enlarge the space for arrangement of refractive power of the system. In addition, the opposite surfaces (object-side surface and image-side surface) of the first to the third lenses could be aspheric that can obtain more control parameters to reduce aberration. The number of aspheric glass lenses could be less than the conventional spherical glass lenses that is helpful for reduction of the height of the system.

When the lens has a convex surface, which means that the surface is convex around a position, through which the optical axis passes, and when the lens has a concave surface, which means that the surface is concave around a position, through which the optical axis passes.

The optical image capturing system of the present invention further is provided with a diaphragm to increase image quality.

In the optical image capturing system, the diaphragm could be a front diaphragm or a middle diaphragm, wherein the front diaphragm is provided between the object and the first lens, and the middle is provided between the first lens and the image plane. The front diaphragm provides a long distance between an exit pupil of the system and the image plane, which allows more elements to be installed. The middle diaphragm could enlarge a view angle of view of the system and increase the efficiency of the image sensor. The middle diaphragm is helpful for size reduction and wide angle.

The optical image capturing system of the present invention could be applied in dynamic focusing optical system. It is superior in correction of aberration and high imaging quality so that it could be allied in lots of fields.

The optical image capturing system of the present invention could further include a driving module to meet different demands, wherein the driving module can be coupled with the lenses to move the lenses. The driving module can be a voice coil motor (VCM), which is used to move the lens for focusing, or can be an optical image stabilization (OIS) component, which is used to lower the possibility of having the problem of image blurring which is caused by subtle movements of the lens while shooting.

We provide several embodiments in conjunction with the accompanying drawings for the best understanding, which are:

First Embodiment

As shown in FIG. 1A and FIG. 1B, an optical image capturing system 10 of the first embodiment of the present invention includes, along an optical axis from an object side to an image side, a first lens 110, an aperture 100, a second lens 120, a third lens 130, an infrared rays filter 170, an image plane 180, and an image sensor 190. FIG. 1C shows a tangential fan and a sagittal fan of the optical image capturing system 10 of the first embodiment of the present application, and a transverse aberration diagram at 0.7 field of view when a longest operation wavelength and a shortest operation wavelength pass through an edge of the aperture 100.

The first lens 110 has positive refractive power, and is made of plastic. An object-side surface 112 thereof, which faces the object side, is a convex aspheric surface, and an image-side surface 114 thereof, which faces the image side, is a concave aspheric surface. A profile curve length of the maximum effective half diameter of an object-side surface of the first lens 110 is denoted by ARS11, and a profile curve length of the maximum effective half diameter of the image-side surface of the first lens 110 is denoted by ARS12. A profile curve length of a half of an entrance pupil diameter (HEP) of the object-side surface of the first lens 110 is denoted by ARE11, and a profile curve length of a half of the entrance pupil diameter (HEP) of the image-side surface of the first lens 110 is denoted by ARE12. A thickness of the first lens 110 on the optical axis is TP1.

The second lens 120 has negative refractive power, and is made of plastic. An object-side surface 122 thereof, which faces the object side, is a concave aspheric surface, and an image-side surface 124 thereof, which faces the image side, is a convex aspheric surface, and the image-side surface 124 has an inflection point. The second lens 120 satisfies SGI221=−0.1526 mm and |SGI221|/(|SGI221|+TP2) =0.2292, where SGI221 is a displacement in parallel with the optical axis from a point on the image-side surface of the second lens, through which the optical axis passes, to the inflection point on the image-side surface, which is the closest to the optical axis. A profile curve length of the maximum effective half diameter of an object-side surface of the second lens 120 is denoted by ARS21, and a profile curve length of the maximum effective half diameter of the image-side surface of the second lens 120 is denoted by ARS22. A profile curve length of a half of an entrance pupil diameter (HEP) of the object-side surface of the second lens 120 is denoted by ARE21, and a profile curve length of a half of the entrance pupil diameter (HEP) of the image-side surface of the second lens 120 is denoted by ARE22. A thickness of the second lens 120 on the optical axis is TP2.

The second lens further satisfies HIF221=0.5606 mm and HIF221/HOI=0.3128, where HIF221 is a displacement perpendicular to the optical axis from a point on the image-side surface of the second lens, through which the optical axis passes, to the inflection point, which is the closest to the optical axis.

The third lens 130 has positive refractive power, and is made of plastic. An object-side surface 132, which faces the object side, is a convex aspheric surface, and an image-side surface 134, which faces the image side, is a concave aspheric surface. The object-side surface 132 has two inflection points, and the image-side surface 134 has an inflection point. The third lens 130 satisfies SGI311=0.0180 mm; SGI321=0.0331 mm and |SGI311|/(|SGI311|+TP3)=0.0339 and |SGI321|/(|SGI321|+TP3)=0.0605, where SGI311 is a displacement in parallel with the optical axis, from a point on the object-side surface of the third lens, through which the optical axis passes, to the inflection point on the object-side surface, which is the closest to the optical axis, and SGI321 is a displacement in parallel with the optical axis, from a point on the image-side surface of the third lens, through which the optical axis passes, to the inflection point on the image-side surface, which is the closest to the optical axis. A profile curve length of the maximum effective half diameter of an object-side surface of the third lens 130 is denoted by ARS31, and a profile curve length of the maximum effective half diameter of the image-side surface of the third lens 130 is denoted by ARS32. A profile curve length of a half of an entrance pupil diameter (HEP) of the object-side surface of the third lens 130 is denoted by ARE31, and a profile curve length of a half of the entrance pupil diameter (HEP) of the image-side surface of the third lens 130 is denoted by ARE32. A thickness of the third lens 130 on the optical axis is TP3.

The third lens 130 further satisfies SGI312=−0.0367 mm and |SGI312|/(|SGI312|+TP3)=0.0668, where SGI312 is a displacement in parallel with the optical axis, from a point on the object-side surface of the third lens, through which the optical axis passes, to the inflection point on the object-side surface, which is the second closest to the optical axis.

The third lens 130 further satisfies HIF311=0.2298 mm; HIF321=0.3393 mm; HIF311/HOI=0.1282; and HIF321/HOI=0.1893, where HIF311 is a distance perpendicular to the optical axis between the inflection point on the object-side surface of the third lens, which is the closest to the optical axis, and the optical axis, and HIF321 is a distance perpendicular to the optical axis between the inflection point on the image-side surface of the third lens, which is the closest to the optical axis, and the optical axis.

The third lens 130 further satisfies HIF312=0.8186 mm and HIF312/HOI=0.4568, where HIF312 is a distance perpendicular to the optical axis between the inflection point on the object-side surface of the third lens, which is the second closest to the optical axis, and the optical axis.

The infrared rays filter 170 is made of glass, and between the third lens 130 and the image plane 180. The infrared rays filter 170 gives no contribution to the focal length of the system.

The optical image capturing system 10 of the first embodiment has the following parameters, which are f=2.42952 mm; f/HEP=2.02; and HAF=35.87 degrees and tan(HAF)=0.7231, where f is a focal length of the system; HAF is a half of the maximum field angle; and HEP is an entrance pupil diameter.

The parameters of the lenses of the first embodiment are f1=2.27233 mm; |f/f1|=1.06962; f3=7.0647 mm; |f1|≤f3; and |f1/f3|=0.3216, where f1 is a focal length of the first lens 110; and f3 is a focal length of the third lens 130.

The first embodiment further satisfies f2=−5.2251 mm and |f2|>|f1|, where f2 is a focal length of the second lens 120 and f3 is a focal length of the third lens 130.

The optical image capturing system 10 of the first embodiment further satisfies ΣPPR=f/f1+f/f3=1.4131; ΣNPR=f/f2=0.4650; ΣPPR/|ΣNPR|=3.0391; |f/f3|=0.3439; |f1/f2|=0.4349; and |f2/f3|=0.7396, where PPR is a ratio of a focal length f of the optical image capturing system to a focal length fp of each of the lenses with positive refractive power; and NPR is a ratio of a focal length f of the optical image capturing system to a focal length fn of each of lenses with negative refractive power.

The optical image capturing system 10 of the first embodiment further satisfies InTL+InB=HOS; HOS=2.9110 mm; HOI=1.792 mm; HOS/HOI=1.6244; HOS/f=1.1982; InTL/HOS=0.7008; InS=2.25447 mm; and InS/HOS=0.7745, where InTL is a distance between the object-side surface 112 of the first lens 110 and the image-side surface 134 of the third lens 130; HOS is a height of the image capturing system, i.e. a distance between the object-side surface 112 of the first lens 110 and the image plane 180; InS is a distance between the aperture 100 and the image plane 180; HOI is a half of a diagonal of an effective sensing area of the image sensor 190, i.e., the maximum image height; and InB is a distance between the image-side surface 134 of the third lens 130 and the image plane 180.

The optical image capturing system 10 of the first embodiment further satisfies ΣTP=1.4198 mm and ΣTP/InTL=0.6959, where ΣTP is a sum of the thicknesses of the lenses 110-130 with refractive power. It is helpful for the contrast of image and yield rate of manufacture, and provides a suitable back focal length for installation of other elements.

The optical image capturing system 10 of the first embodiment further satisfies |R1/R2|=0.3849, where R1 is a radius of curvature of the object-side surface 112 of the first lens 110, and R2 is a radius of curvature of the image-side surface 114 of the first lens 110. It provides the first lens with a suitable positive refractive power to reduce the increase rate of the spherical aberration.

The optical image capturing system 10 of the first embodiment further satisfies (R5−R6)/(R5+R6)=−0.0899, where R5 is a radius of curvature of the object-side surface 132 of the third lens 130, and R6 is a radius of curvature of the image-side surface 134 of the third lens 130. It may modify the astigmatic field curvature.

The optical image capturing system 10 of the first embodiment further satisfies ΣPP=f1+f3=9.3370 mm and f1/(f1+f3)=0.2434, where ΣPP is a sum of the focal lengths fp of each lens with positive refractive power. It is helpful to share the positive refractive power of the first lens 110 to the other positive lens to avoid the significant aberration caused by the incident rays.

The optical image capturing system 10 of the first embodiment further satisfies ΣNP=f2=−5.2251 mm, where f2 is a focal length of the second lens 120, and ΣNP is a sum of the focal lengths fn of each lens with negative refractive power. It is helpful to avoid the significant aberration caused by the incident rays.

The optical image capturing system 10 of the first embodiment further satisfies IN12=0.4068 mm and IN12/f=0.1674, where IN12 is a distance on the optical axis between the first lens 110 and the second lens 120. It may correct chromatic aberration and improve the performance.

The optical image capturing system 10 of the first embodiment further satisfies TP1=0.5132 mm; TP2=0.3363 mm; and (TP1+IN12)/TP2=2.7359, where TP1 is a central thickness of the first lens 110 on the optical axis, and TP2 is a central thickness of the second lens 120 on the optical axis. It may control the sensitivity of manufacture of the system and improve the performance.

The optical image capturing system 10 of the first embodiment further satisfies (TP3+IN23)/TP2=2.3308, where TP3 is a central thickness of the third lens 130 on the optical axis, TP2 is a central thickness of the second lens 120 on the optical axis, and N23 is a distance on the optical axis between the second lens and the third lens. It may control the sensitivity of manufacture of the system and lower the total height of the system.

The optical image capturing system 10 of the first embodiment further satisfies TP2/(IN12+TP2+IN23)=0.35154; TP1/TP2=1.52615; and TP2/TP3=0.58966. It may control the sensitivity of manufacture of the system and lower the total height of the system.

The optical image capturing system 10 of the first embodiment further satisfies TP2/ΣTP=0.2369, where ΣTP is a sum of the central thicknesses of all the lenses with refractive power on the optical axis. It may finely modify the aberration of the incident rays and reduce the height of the system.

The optical image capturing system 10 of the first embodiment further satisfies InRS31=−0.1097 mm; InRS32=−0.3195 mm; |InRS31|+|InRS32|=0.42922 mm; |InRS31|/TP3=0.1923; and |InRS32|/TP3=0.5603, where InRS31 is a displacement in parallel with the optical axis from a point on the object-side surface 132 of the third lens, through which the optical axis passes, to a point at the maximum effective semi diameter of the object-side surface 132 of the third lens; InRS32 is a displacement in parallel with the optical axis from a point on the image-side surface 134 of the third lens, through which the optical axis passes, to a point at the maximum effective semi diameter of the image-side surface 134 of the third lens; and TP3 is a central thickness of the third lens 130 on the optical axis. It is helpful for manufacturing and shaping of the lenses, and is helpful to reduce the size.

The optical image capturing system 10 of the first embodiment satisfies HVT31=0.4455 mm; HVT32=0.6479 mm; and HVT31/HVT32=0.6876, where HVT31 a distance perpendicular to the optical axis between the critical point C31 on the object-side surface 132 of the third lens and the optical axis; and HVT32 a distance perpendicular to the optical axis between the critical point C32 on the image-side surface 134 of the third lens and the optical axis. It is helpful to modify the off-axis view field aberration.

The optical image capturing system 10 of the first embodiment satisfies HVT32/HOI=0.3616. It is helpful for correction of the aberration of the peripheral view field of the optical image capturing system.

The optical image capturing system 10 of the first embodiment satisfies HVT32/HOS=0.2226. It is helpful for correction of the aberration of the peripheral view field of the optical image capturing system.

The second lens 120 has negative refractive power. The optical image capturing system 10 of the first embodiment further satisfies |NA1−NA2|=33.5951; NA3/NA2=2.4969, where NA1 is an Abbe number of the first lens 110; NA2 is an Abbe number of the second lens 120; and NA3 is an Abbe number of the third lens 130. It may correct the aberration of the optical image capturing system.

The optical image capturing system 10 of the first embodiment further satisfies |TDT|=1.2939% and |ODT|=1.4381%, where TDT is TV distortion; and ODT is optical distortion.

For the third lens 130 of the optical image capturing system 10 in the first embodiment, a transverse aberration at 0.7 field of view in the positive direction of the tangential fan after the longest operation wavelength passing through the edge of the aperture 100 is denoted by PLTA, and is 0.0028 mm (the pixel size is 1.12 μm); a transverse aberration at 0.7 field of view in the positive direction of the tangential fan after the shortest operation wavelength passing through the edge of the aperture 100 is denoted by PSTA, and is 0.0163 mm (the pixel size is 1.12 μm); a transverse aberration at 0.7 field of view in the negative direction of the tangential fan after the longest operation wavelength passing through the edge of the aperture 100 is denoted by NLTA, and is 0.0118 mm (the pixel size is 1.12 μm); a transverse aberration at 0.7 field of view in the negative direction of the tangential fan after the shortest operation wavelength passing through the edge of the aperture 100 is denoted by NSTA, and is −0.0019 mm (the pixel size is 1.12 μm); a transverse aberration at 0.7 field of view of the sagittal fan after the longest operation wavelength passing through the edge of the aperture 100 is denoted by SLTA, and is −0.0103 mm (the pixel size is 1.12 μm); a transverse aberration at 0.7 field of view of the sagittal fan after the shortest operation wavelength passing through the edge of the aperture 100 is denoted by SSTA, and is 0.0055 mm (the pixel size is 1.12 μm).

The parameters of the lenses of the first embodiment are listed in Table 1 and Table 2.

TABLE 1 f = 2.42952 mm; f/HEP = 2.02; HAF = 35.87 deg; tan(HAF) = 0.7231

| Surface | | Radius of curvature (mm) | Thickness (mm) | Material | Refractive index | Abbe number | Focal length (mm) |
|---|---|---|---|---|---|---|---|
| 0 | Object | plane | 600 | | | | |
| 1 | $1^{st}$ lens | 0.848804821 | 0.513 | Plastic | 1.535 | 56.070 | 2.273 |
| 2 | | 2.205401548 | 0.143 | | | | |
| 3 | Aperture | Plane | 0.263 | | | | |
| 4 | $2^{nd}$ lens | −1.208297825 | 0.336 | Plastic | 1.643 | 22.470 | −5.225 |
| 5 | | −2.08494476 | 0.214 | | | | |
| 6 | $3^{rd}$ lens | 1.177958479 | 0.570 | Plastic | 1.544 | 56.090 | 7.012 |
| 7 | | 1.410696843 | 0.114 | | | | |
| 8 | Infrared rays filter | Plane | 0.210 | BK7 SCHOTT | | | |
| 9 | | Plane | 0.550 | | | | |
| 10 | Image plane | Plane | 0.000 | | | | |

Reference wavelength: 555 nm; position of blocking light: blocking at the first surface with effective semi diameter of 0.640 mm.

TABLE 2

Coefficients of the aspheric surfaces

| | | | Surface | | | |
|---|---|---|---|---|---|---|
| | 1 | 2 | 4 | 5 | 6 | 7 |
| k | 1.22106E−01 | 1.45448E+01 | 8.53809E−01 | 4.48992E−01 | −1.44104E+01 | −3.61090E+00 |
| A4 | −6.43320E−04 | −9.87186E−02 | −7.81909E−01 | −1.69310E+00 | −7.90920E−01 | −5.19895E−01 |
| A6 | −2.58026E−02 | 2.63247E+00 | −8.49939E−01 | 5.85139E+00 | 4.98290E−01 | 4.24519E−01 |
| A8 | 1.00186E+00 | −5.88099E+01 | 3.03407E+01 | −1.67037E+01 | 2.93540E−01 | −3.12444E−01 |
| A10 | −4.23805E+00 | 5.75648E+02 | −3.11976E+02 | 2.77661E+01 | −3.15288E−01 | 1.42703E−01 |
| A12 | 9.91922E+00 | −3.00096E+03 | 1.45641E+03 | −5.46620E+00 | −9.66930E−02 | −2.76209E−02 |
| A14 | −1.17917E+01 | 7.91934E+03 | −2.89774E+03 | −2.59816E+01 | 1.67006E−01 | −3.11872E−03 |
| A16 | 8.87410E+00 | −8.51578E+03 | 1.35594E+03 | 1.43091E+01 | −4.43712E−02 | 1.34499E−03 |
| A18 | 0.00000E+00 | 0.00000E+00 | 0.00000E+00 | 0.00000E+00 | 0.00000E+00 | 0.00000E+00 |
| A20 | 0.00000E+00 | 0.00000E+00 | 0.00000E+00 | 0.00000E+00 | 0.00000E+00 | 0.00000E+00 |

The figures related to the profile curve lengths obtained based on Table 1 and Table 2 are listed in the following table:

| First embodiment (Reference wavelength: 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.604 | 0.678 | 0.074 | 112.28% | 0.513 | 132.12% |
| 12 | 0.506 | 0.511 | 0.005 | 101.08% | 0.513 | 99.66% |
| 21 | 0.509 | 0.552 | 0.043 | 108.36% | 0.336 | 164.03% |
| 22 | 0.604 | 0.640 | 0.036 | 106.04% | 0.336 | 190.42% |
| 31 | 0.604 | 0.606 | 0.002 | 100.28% | 0.570 | 106.18% |
| 32 | 0.604 | 0.607 | 0.003 | 100.50% | 0.570 | 106.41% |
| ARS | EHD | ARS value | ARS − EHD | (ARS/EHD) % | TP | ARS/TP (%) |
| 11 | 0.640 | 0.736 | 0.096 | 114.97% | 0.513 | 143.37% |
| 12 | 0.506 | 0.511 | 0.005 | 101.08% | 0.513 | 99.66% |
| 21 | 0.509 | 0.552 | 0.043 | 108.36% | 0.336 | 164.03% |
| 22 | 0.710 | 0.758 | 0.048 | 106.79% | 0.336 | 225.48% |
| 31 | 1.091 | 1.111 | 0.020 | 101.83% | 0.570 | 194.85% |
| 32 | 1.340 | 1.478 | 0.138 | 110.32% | 0.570 | 259.18% |

The detail parameters of the first embodiment are listed in Table 1, in which the unit of radius of curvature, thickness, and focal length are millimeter, and surface 0-10 indicates the surfaces of all elements in the system in sequence from the object side to the image side. Table 2 is the list of coefficients of the aspheric surfaces, in which A1-A20 indicate the coefficients of aspheric surfaces from the first order to the twentieth order of each aspheric surface. The following embodiments have the similar diagrams and tables, which are the same as those of the first embodiment, so we do not describe it again.

Second Embodiment

Figure 2A:
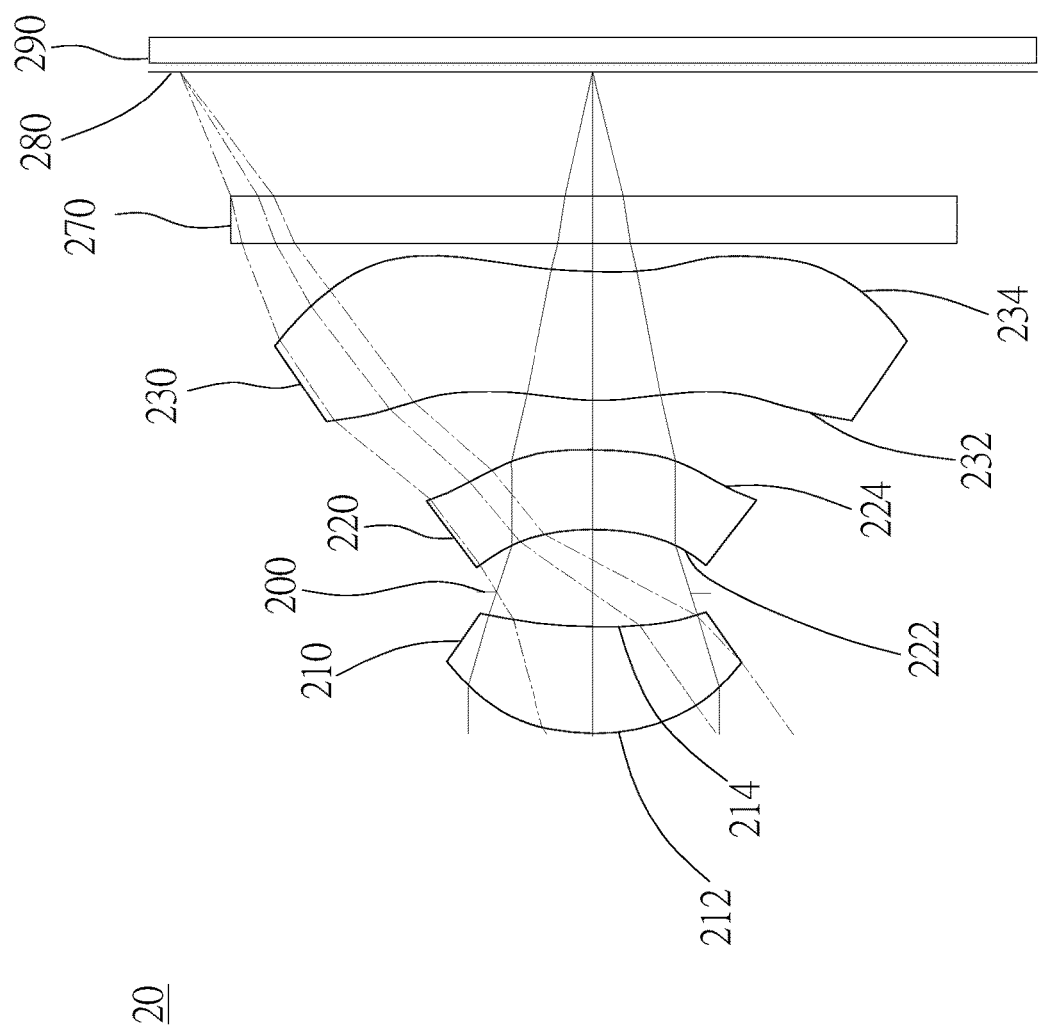
FIG. 2A is a schematic diagram of a second embodiment of the present invention.
Figure 2:
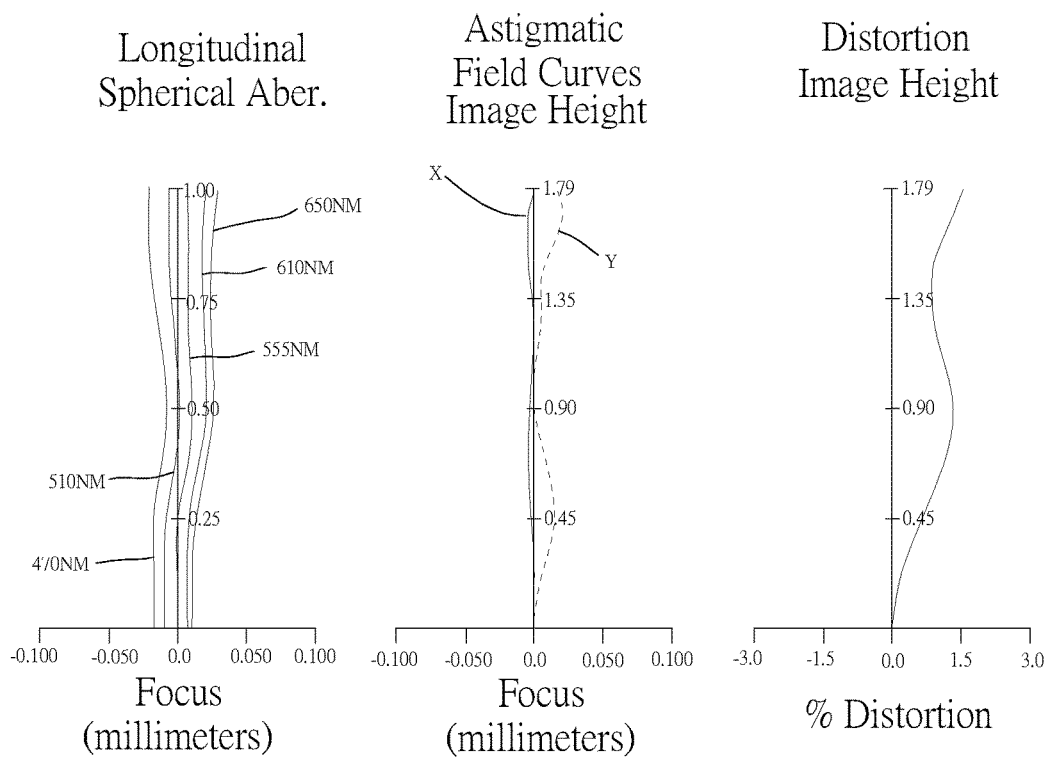
FIG. 2B shows curve diagrams of longitudinal spherical aberration, astigmatic field, and optical distortion of the optical image capturing system in the order from left to right of the second embodiment of the present application.
FIG. 2C shows a tangential fan and a sagittal fan of the optical image capturing system of the first embodiment of the present application, and a transverse aberration diagram at 0.7 field of view when a longest operation wavelength and a shortest operation wavelength pass through an edge of an aperture.
Figure 2:
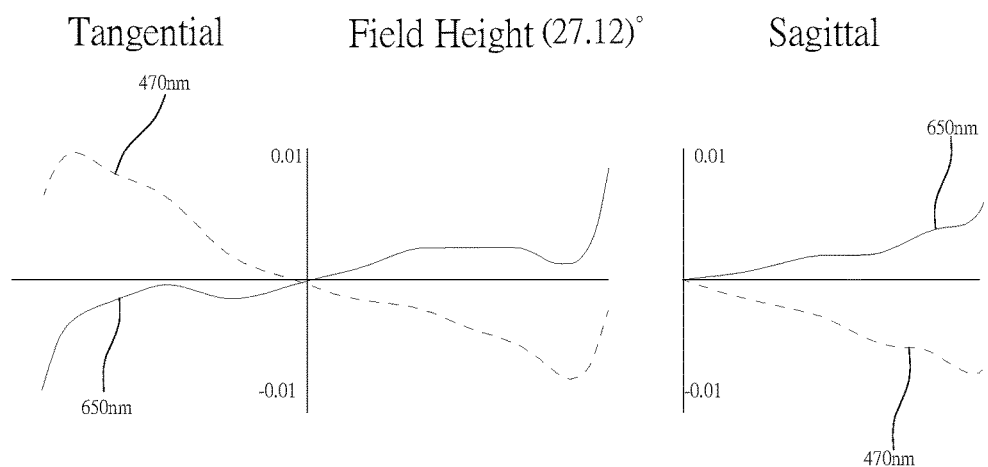

As shown in FIG. 2A and FIG. 2B, an optical image capturing system 20 of the second embodiment of the present invention includes, along an optical axis from an object side to an image side, an aperture 200, a first lens 210, a second lens 220, a third lens 230, an infrared rays filter 270, an image plane 280, and an image sensor 290.

The first lens 210 has positive refractive power, and is made of plastic. An object-side surface 212 thereof, which faces the object side, is a convex aspheric surface, and an image-side surface 214 thereof, which faces the image side, is a concave aspheric surface.

The second lens 220 has negative refractive power, and is made of plastic. An object-side surface 222 thereof, which faces the object side, is a concave aspheric surface, and an image-side surface 224 thereof, which faces the image side, is a convex aspheric surface. The image-side surface 224 has an inflection point.

The third lens 230 has positive refractive power, and is made of plastic. An object-side surface 232, which faces the object side, is a convex aspheric surface, and an image-side surface 234, which faces the image side, is a concave aspheric surface. The object-side surface 232 has two inflection points, and the image-side surface 234 has an inflection point.

The infrared rays filter 270 is made of glass, and between the third lens 230 and the image plane 280. The infrared rays filter 270 gives no contribution to the focal length of the system.

In the second embodiment, the first and the third lenses 210 and 230 are positive lenses, and their focal lengths are f1 and f3. The optical image capturing system of the second embodiment further satisfies $\Sigma PP=f1+f3=9.59177$ mm and $f1/(f1+f3)=0.23269$, where $\Sigma PP$ is a sum of the focal lengths of each positive lens. It is helpful to share the positive refractive power of the first lens 210 to the other positive lens to avoid the significant aberration caused by the incident rays.

The optical image capturing system of the second embodiment further satisfies $\Sigma NP=f2$, where f2 is a focal length of the second lens 220, and $\Sigma NP$ is a sum of the focal lengths of each negative lens.

The parameters of the lenses of the second embodiment are listed in Table 3 and Table 4.

TABLE 3 f = 2.411 mm; f/HEP = 2.22; HAF = 36 deg; tan(HAF) = 0.7265

| Surface | | Radius of curvature (mm) | Thickness (mm) | Material | Refractive index | Abbe number | Focal length (mm) |
|---|---|---|---|---|---|---|---|
| 0 | Object | plane | 600 | | | | |
| 1 | 1st lens | 0.840352226 | 0.468 | Plastic | 1.535 | 56.07 | 2.232 |
| 2 | | 2.271975602 | 0.148 | | | | |
| 3 | Aperture | Plane | 0.277 | | | | |
| 4 | 2nd lens | −1.157324239 | 0.349 | Plastic | 1.642 | 22.46 | −5.221 |
| 5 | | −1.968404008 | 0.221 | | | | |
| 6 | 3rd lens | 1.151874235 | 0.559 | Plastic | 1.544 | 56.09 | 7.360 |
| 7 | | 1.338105159 | 0.123 | | | | |
| 8 | Infrared rays filter | Plane | 0.210 | BK7 SCHOTT | 1.517 | 64.13 | |
| 9 | | Plane | 0.550 | | | | |
| 10 | Image plane | Plane | 0.000 | | | | |

Reference wavelength: 555 nm; position of blocking light: blocking at the first surface with effective semi diameter of 0.640 mm.

TABLE 4

Coefficients of the aspheric surfaces

| | Surface | | | | | |
|---|---|---|---|---|---|---|
| | 1 | 2 | 4 | 5 | 6 | 7 |
| k | −2.019203E−01 | 1.528275E+01 | 3.743939E+00 | −1.207814E+01 | −1.276860E+01 | −3.034004E+00 |
| A4 | 3.944883E−02 | −1.670490E−01 | −4.266331E−01 | −1.696843E+00 | −7.396546E−01 | −5.308488E−01 |
| A6 | 4.774062E−01 | 3.857435E+00 | −1.423859E+00 | 5.164775E+00 | 4.449101E−01 | 4.374142E−01 |
| A8 | −1.528780E+00 | −7.091408E+01 | 4.119587E+01 | −1.445541E+01 | 2.622372E−01 | −3.111192E−01 |
| A10 | 5.133947E+00 | 6.365801E+02 | −3.456462E+02 | 2.876958E+01 | −2.510946E−01 | 1.354257E−01 |
| A12 | −6.250496E+00 | −3.141002E+03 | 1.495452E+03 | −2.662400E+01 | −1.048030E−01 | −2.652902E−02 |
| A14 | 1.068803E+00 | 7.962834E+03 | −2.747802E+03 | 1.661634E+01 | 1.462137E−01 | −1.203306E−03 |
| A16 | 7.995491E+00 | −8.268637E+03 | 1.443133E+03 | −1.327827E+01 | −3.676651E−02 | 7.805611E−04 |
| A18 | 0.000000E+00 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 | 0.000000E+00 |

An equation of the aspheric surfaces of the second embodiment is the same as that of the first embodiment, and the definitions are the same as well.

The exact parameters of the second embodiment based on Table 3 and Table 4 are listed in the following table:

Second embodiment (Reference wavelength: 555 nm)

| |f/f1| | |f/f2| | |f/f3| | |f1/f2| | |f2/f3| | TP1/TP2 |
|---|---|---|---|---|---|
| 1.08042 | 0.46186 | 0.32763 | 2.33928 | 1.40968 | 1.33921 |

-continued

| Second embodiment (Reference wavelength: 555 nm) | | | | | |
|---|---|---|---|---|---|
| ΣPPR | ΣNPR | ΣPPR/\|ΣNPR\| | IN12/f | IN23/f | TP2/TP3 |
| 1.40805 | 0.46186 | 3.04866 | 0.17636 | 0.09155 | 0.62498 |
| TP2/(IN12 + TP2 + IN23) | | (TP1 + IN12)/TP2 | | (TP3 + IN23)/TP2 | |
| 0.35102 | | 2.23183 | | 2.23183 | |
| HOS | InTL | HOS/HOI | InS/HOS | \|ODT\| % | \|TDT\| % |
| 2.90175 | 2.02243 | 1.61928 | 0.78770 | 1.50000 | 0.71008 |
| HVT21 | HVT22 | HVT31 | HVT32 | HVT32/HOI | HVT32/HOS |
| 0.00000 | 0.00000 | 0.46887 | 0.67544 | 0.37692 | 0.23277 |
| PLTA | PSTA | NLTA | NSTA | SLTA | SSTA |
| −0.0022 mm | 0.0085 mm | 0.0063 mm | −0.0082 mm | −0.0066 mm | 0.0060 mm |

The results of the equations of the second embodiment based on Table 3 and Table 4 are listed in the following table:

| Values related to the inflection points of the second embodiment (Reference wavelength: 555 nm) | | | | | | |
|---|---|---|---|---|---|---|
| HIF221 | 0.55994 | HIF221/HOI | 0.31247 | SGI221 | −0.14873 | \|SGI221\|/(\|SGI221\| + TP2) 0.24119 |
| HIF311 | 0.24054 | HIF311/HOI | 0.13423 | SGI311 | 0.02014 | \|SGI311\|/(\|SGI311\| + TP3) 0.04126 |
| HIF312 | 0.82551 | HIF312/HOI | 0.46067 | SGI312 | −0.02337 | \|SGI312\|/(\|SGI312\| + TP3) 0.04756 |
| HIF321 | 0.35053 | HIF321/HOI | 0.19561 | SGI321 | 0.03714 | \|SGI321\|/(\|SGI321\| + TP3) 0.07354 |

The figures related to the profile curve lengths obtained based on Table 3 and Table 4 are listed in the following table:

| Second embodiment (Reference wavelength: 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.546 | 0.598 | 0.052 | 109.49% | 0.468 | 127.80% |
| 12 | 0.496 | 0.500 | 0.004 | 100.88% | 0.468 | 106.92% |
| 21 | 0.496 | 0.535 | 0.039 | 107.80% | 0.349 | 153.18% |
| 22 | 0.546 | 0.572 | 0.026 | 104.78% | 0.349 | 163.78% |
| 31 | 0.546 | 0.548 | 0.002 | 100.36% | 0.559 | 98.04% |
| 32 | 0.546 | 0.550 | 0.004 | 100.80% | 0.559 | 98.47% |
| ARS | EHD | ARS value | ARS − EHD | (ARS/EHD) % | TP | ARS/TP (%) |
| 11 | 0.640 | 0.739 | 0.099 | 115.54% | 0.468 | 158.03% |
| 12 | 0.496 | 0.500 | 0.004 | 100.88% | 0.468 | 106.92% |
| 21 | 0.496 | 0.535 | 0.039 | 107.80% | 0.349 | 153.18% |
| 22 | 0.729 | 0.774 | 0.046 | 106.27% | 0.349 | 221.62% |
| 31 | 1.215 | 1.233 | 0.018 | 101.47% | 0.559 | 220.57% |
| 32 | 1.416 | 1.598 | 0.183 | 112.89% | 0.559 | 285.85% |

Third Embodiment

Figure 3A:
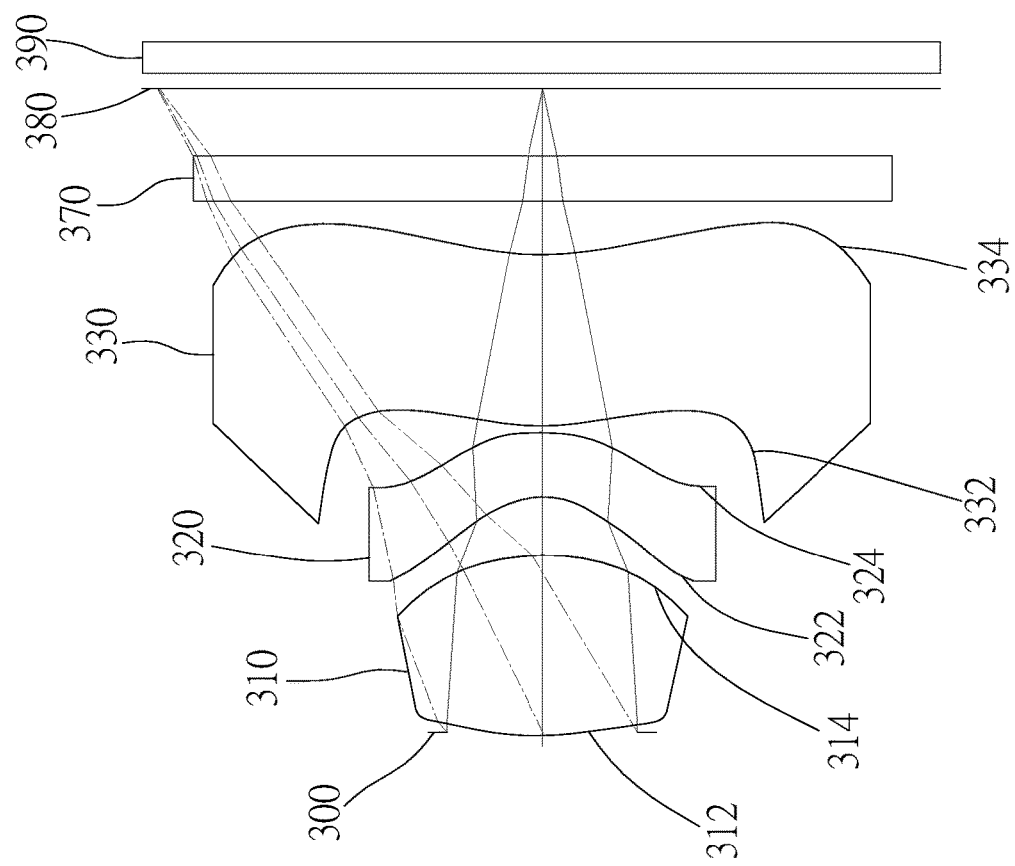
FIG. 3A is a schematic diagram of a third embodiment of the present invention.
Figure 3:
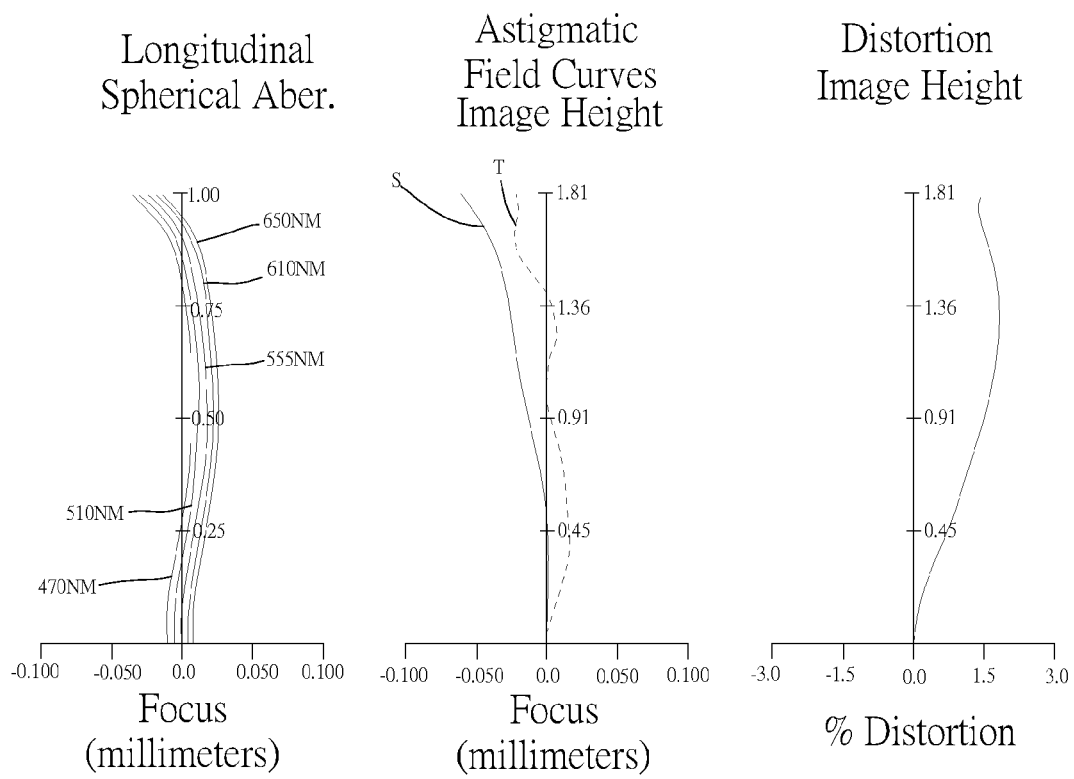
FIG. 3B shows curve diagrams of longitudinal spherical aberration, astigmatic field, and optical distortion of the optical image capturing system in the order from left to right of the third embodiment of the present application.
FIG. 3C shows a tangential fan and a sagittal fan of the optical image capturing system of the first embodiment of the present application, and a transverse aberration diagram at 0.7 field of view when a longest operation wavelength and a shortest operation wavelength pass through an edge of an aperture.
Figure 3:
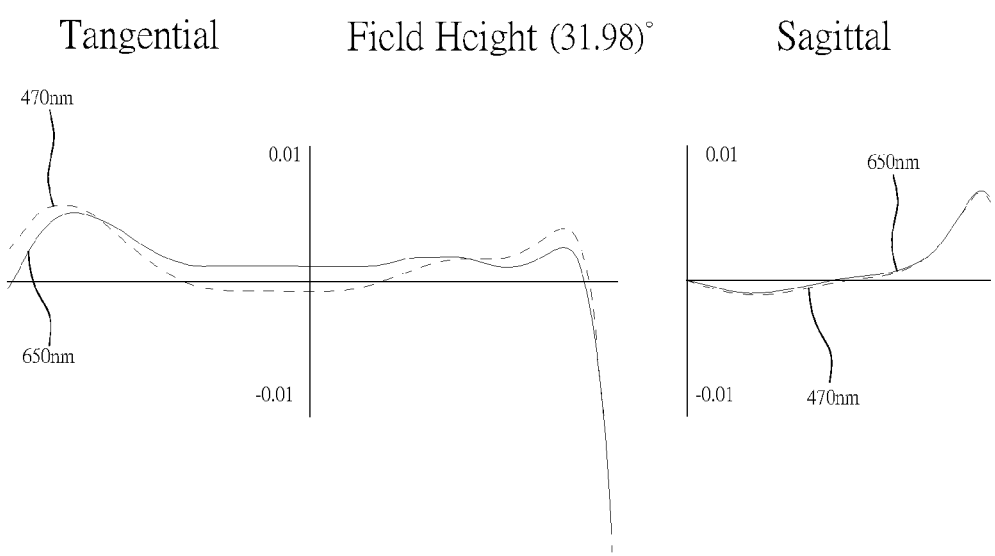

As shown in FIG. 3A and FIG. 3B, an optical image capturing system of the third embodiment of the present invention includes, along an optical axis from an object side to an image side, an aperture 300, a first lens 310, a second lens 320, a third lens 330, an infrared rays filter 370, an image plane 380, and an image sensor 390.

The first lens 310 has positive refractive power, and is made of plastic. An object-side surface 312 thereof, which faces the object side, is a convex aspheric surface, and an image-side surface 314 thereof, which faces the image side, is a convex aspheric surface. The object-side surface 312 has two inflection points, and the image-side surface 314 has an inflection point.

The second lens 320 has negative refractive power, and is made of plastic. An object-side surface 322 thereof, which faces the object side, is a concave aspheric surface, and an image-side surface 324 thereof, which faces the image side, is a convex aspheric surface. The object-side surface 322 and the image-side surface 324 respectively have an inflection point.

The third lens 330 has positive refractive power, and is made of plastic. An object-side surface 332 thereof, which faces the object side, is a convex surface, and an image-side surface 334 thereof, which faces the image side, is a concave aspheric surface. The object-side surface 332 and the image-side surface 334 respectively have an inflection point.

The infrared rays filter 370 is made of glass, and between the third lens 330 and the image plane 380. The infrared rays filter 370 gives no contribution to the focal length of the system.

In the third embodiment, the first and the third lenses 310 and 330 are positive lenses, and their focal lengths are f1 and f3. The optical image capturing system of the third embodiment further satisfies ΣPP=f1+f3=10.86930 mm and f1/(f1+f3)=0.12995, where ΣPP is a sum of the focal lengths of each positive lens. It is helpful to share the positive refractive power of the first lens 310 to the other positive lens to avoid the significant aberration caused by the incident rays.

The optical image capturing system of the third embodiment further satisfies $\Sigma NP=f2$, where f2 is a focal length of the second lens 320 and $\Sigma NP$ is a sum of the focal lengths of each negative lens.

The parameters of the lenses of the third embodiment are listed in Table 5 and Table 6.

TABLE 5

| f = 1.9801 mm; f/HEP = 2.219; HAF = 41.8831 deg; tan(HAF) = 0.8967 |||||||
| --- | --- | --- | --- | --- | --- | --- |
| Surface | Radius of curvature (mm) | Thickness (mm) | Material | Refractive index | Abbe number | Focal length (mm) |
| 0 | Object | plane | 600 | | | |
| 1 | Aperture | Plane | −0.010 | | | |
| 2 | 1$^{st}$ lens | 1.691109329 | 0.846 | Plastic | 1.535 | 56.07 | 1.412 |
| 3 | | −1.132731845 | 0.278 | | | |
| 4 | 2$^{nd}$ lens | −0.391595003 | 0.311 | Plastic | 1.642 | 22.46 | −3.037 |
| 5 | | −0.641741143 | 0.030 | | | |
| 6 | 3$^{rd}$ lens | 1.406984957 | 0.815 | Plastic | 1.535 | 56.07 | 9.457 |
| 7 | | 1.553255062 | 0.252 | | | |
| 8 | Infrared rays filter | Plane | 0.210 | BK7 SCHOTT | 1.517 | 64.13 | |
| 9 | | Plane | 0.318 | | | |
| 10 | Image plane | Plane | | | | |

Reference wavelength: 555 nm.

TABLE 6

Coefficients of the aspheric surfaces

| | Surface |||||| 
| --- | --- | --- | --- | --- | --- | --- |
| | 2 | 3 | 4 | 5 | 6 | 7 |
| k | −1.949115E+01 | −2.320148E+00 | −7.413095E−01 | −9.167540E−01 | −2.841731E−01 | −5.961438E+00 |
| A4 | 2.503769E−01 | −5.273542E−01 | 1.655925E+00 | 4.218113E−01 | −6.113581E−01 | −1.131550E−01 |
| A6 | −1.682460E−01 | 9.285361E−01 | −1.468505E+00 | −3.857547E−01 | 3.316423E−01 | 4.313548E−02 |
| A8 | −5.745426E+00 | −7.689350E+00 | 7.090514E+00 | 2.868973E+00 | 1.295575E−01 | −2.339485E−02 |
| A10 | 1.711465E+01 | 2.199660E+01 | 5.324183E+00 | −2.289240E+00 | −3.944963E−01 | −1.799633E−03 |
| A12 | 2.558724E+01 | 1.216111E+01 | −5.050230E+01 | −1.590342E+00 | −1.036998E+00 | 8.737996E−03 |
| A14 | −3.979505E+02 | −1.451439E+02 | 5.272043E+01 | −9.558163E−01 | 2.553700E+00 | −4.233080E−03 |
| A16 | 9.232178E+02 | 1.634916E+02 | 1.465224E+01 | 3.506766E+00 | −1.540374E+00 | 5.775537E−04 |
| A18 | 0.000000E+00 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 | 0.000000E+00 |

An equation of the aspheric surfaces of the third embodiment is the same as that of the first embodiment, and the definitions are the same as well.

The exact parameters of the third embodiment based on Table 5 and Table 6 are listed in the following table:

| Third embodiment (Reference wavelength: 555 nm) ||||||
| --- | --- | --- | --- | --- | --- |
| |f/f1| | |f/f2| | |f/f3| | |f1/f2| | |f2/f3| | TP1/TP2 |
| 1.40190 | 0.65197 | 0.20938 | 2.15026 | 3.11374 | 2.71605 |
| ΣPPR | ΣNPR | ΣPPR/|ΣNPR| | IN12/f | IN23/f | TP2/TP3 |
| 1.61128 | 0.65197 | 2.47142 | 0.14047 | 0.01513 | 0.38192 |
| TP2/(IN12 + TP2 + IN23) || (TP1 + IN12)/TP2 || (TP3 + IN23)/TP3 ||
| 0.50262 || 2.71454 || 2.71454 ||
| HOS | InTL | HOS/HOI | InS/HOS | |ODT| % | |TDT| % |
| 3.06079 | 2.28034 | 1.68732 | 0.99670 | 1.80037 | 0.41587 |
| HVT21 | HVT22 | HVT31 | HVT32 | HVT32/HOI | HVT32/HOS |
| 0.00000 | 0.78002 | 0.66345 | 1.02598 | 0.56559 | 0.33520 |
| PLTA | PSTA | NLTA | NSTA | SLTA | SSTA |
| −0.0205 mm | −0.0201 mm | 0.0022 mm | −0.0007 mm | 0.0058 mm | 0.0062 mm |

The results of the equations of the third embodiment based on Table 5 and Table 6 are listed in the following table:

| Values related to the inflection points of the third embodiment (Reference wavelength: 555 nm) | | | | | | | |
|---|---|---|---|---|---|---|---|
| HIF111 | 0.39679 | HIF111/HOI | 0.21874 | SGI111 | 0.04192 | \|SGI111\|/(\|SGI111\| + TP1) | 0.04723 |
| HIF112 | 0.48113 | HIF112/HOI | 0.26523 | SGI112 | 0.05664 | \|SGI112\|/(\|SGI112\| + TP1) | 0.06277 |
| HIF121 | 0.66515 | HIF121/HOI | 0.36667 | SGI121 | −0.27197 | \|SGI121\|/(\|SGI121\| + TP1) | 0.24334 |
| HIF211 | 0.45154 | HIF211/HOI | 0.24892 | SGI211 | −0.21995 | \|SGI211\|/(\|SGI211\| + TP2) | 0.20641 |
| HIF221 | 0.46846 | HIF221/HOI | 0.25825 | SGI221 | −0.15138 | \|SGI221\|/(\|SGI221\| + TP2) | 0.15183 |
| HIF311 | 0.35453 | HIF311/HOI | 0.19544 | SGI311 | 0.03620 | \|SGI311\|/(\|SGI311\| + TP3) | 0.04105 |
| HIF321 | 0.54042 | HIF321/HOI | 0.29792 | SGI321 | 0.07426 | \|SGI321\|/(\|SGI321\| + TP3) | 0.08073 |

The figures related to the profile curve lengths obtained based on Table 5 and Table 6 are listed in the following table:

| Third embodiment (Reference wavelength: 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.448 | 0.451 | 0.003 | 100.68% | 0.846 | 53.28% |
| 12 | 0.448 | 0.463 | 0.016 | 103.56% | 0.846 | 54.81% |
| 21 | 0.448 | 0.507 | 0.059 | 113.18% | 0.311 | 162.70% |
| 22 | 0.448 | 0.474 | 0.026 | 105.82% | 0.311 | 152.11% |
| 31 | 0.448 | 0.450 | 0.003 | 100.63% | 0.815 | 55.25% |
| 32 | 0.448 | 0.451 | 0.004 | 100.80% | 0.815 | 55.34% |
| ARS | EHD | ARS value | ARS − EHD | (ARS/EHD) % | TP | ARS/TP (%) |
| 11 | 0.491 | 0.494 | 0.003 | 100.70% | 0.846 | 58.44% |
| 12 | 0.682 | 0.764 | 0.082 | 112.01% | 0.846 | 90.40% |
| 21 | 0.702 | 0.816 | 0.114 | 116.31% | 0.311 | 262.22% |
| 22 | 0.798 | 0.850 | 0.052 | 106.51% | 0.311 | 273.04% |
| 31 | 0.926 | 0.951 | 0.025 | 102.67% | 0.815 | 116.67% |
| 32 | 1.456 | 1.514 | 0.058 | 103.97% | 0.815 | 185.75% |

Fourth Embodiment

Figure 4A:
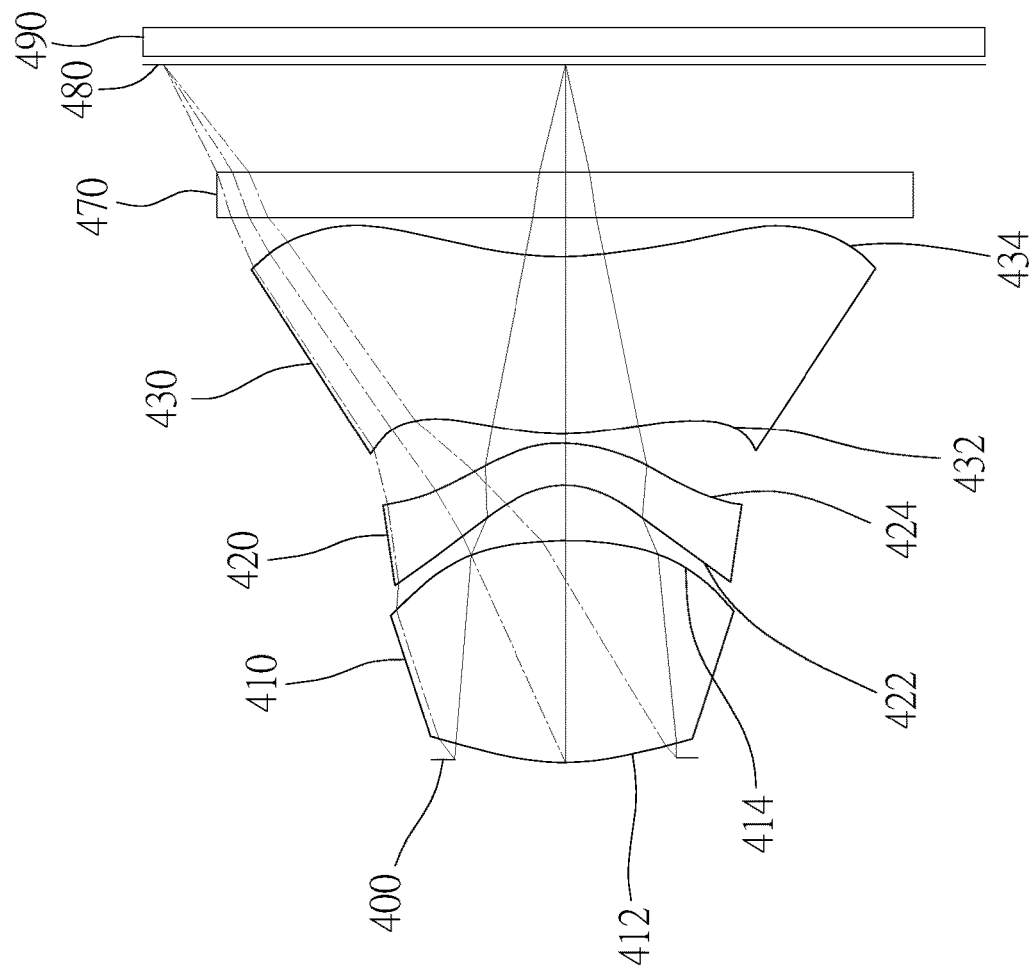
FIG. 4A is a schematic diagram of a fourth embodiment of the present invention.
Figure 4:
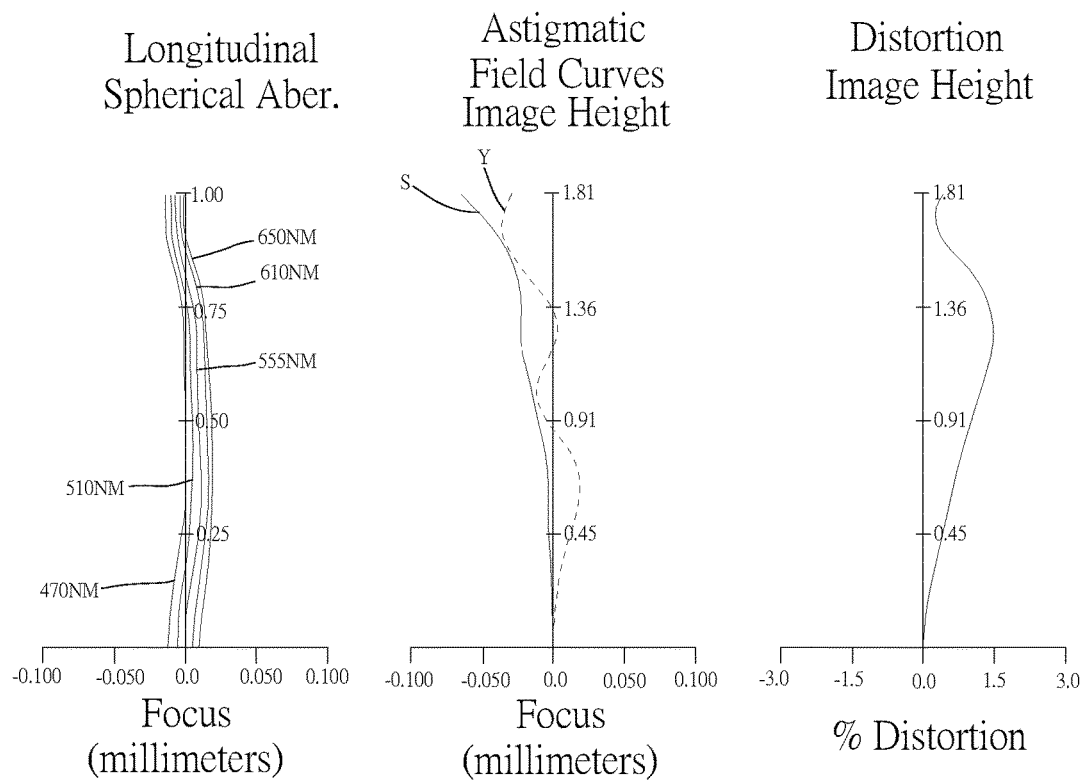
FIG. 4B shows curve diagrams of longitudinal spherical aberration, astigmatic field, and optical distortion of the optical image capturing system in the order from left to right of the fourth embodiment of the present application.
FIG. 4C shows a tangential fan and a sagittal fan of the optical image capturing system of the first embodiment of the present application, and a transverse aberration diagram at 0.7 field of view when a longest operation wavelength and a shortest operation wavelength pass through an edge of an aperture.
Figure 4:
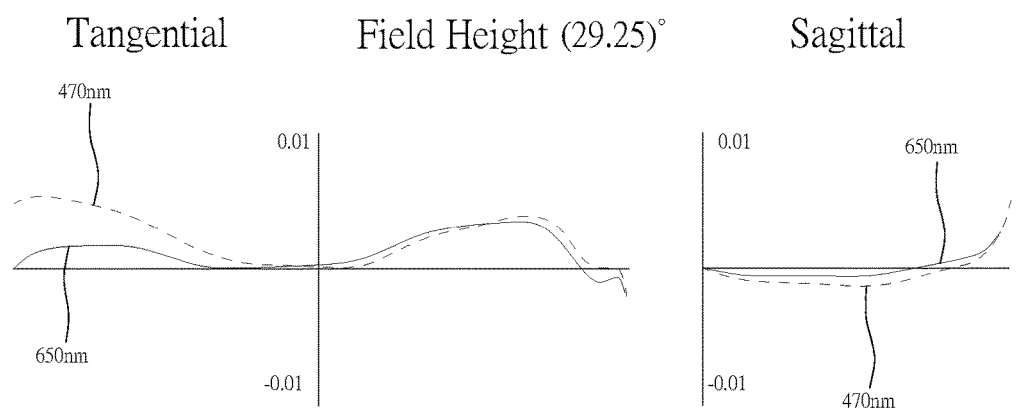

As shown in FIG. 4A and FIG. 4B, an optical image capturing system 40 of the fourth embodiment of the present invention includes, along an optical axis from an object side to an image side, an aperture 400, a first lens 410, a second lens 420, a third lens 430, an infrared rays filter 470, an image plane 480, and an image sensor 490.

The first lens 410 has positive refractive power, and is made of plastic. An object-side surface 412 thereof, which faces the object side, is a convex aspheric surface, and an image-side surface 414 thereof, which faces the image side, is a convex aspheric surface. The object-side surface 412 has an inflection point.

The second lens 420 has negative refractive power, and is made of plastic. An object-side surface 422 thereof, which faces the object side, is a concave aspheric surface, and an image-side surface 424 thereof, which faces the image side, is a convex aspheric surface. The object-side surface 422 and the image-side surface 424 respectively have an inflection point.

The third lens 430 has positive refractive power, and is made of plastic. An object-side surface 432 thereof, which faces the object side, is a convex aspheric surface, and an image-side surface 434 thereof, which faces the image side, is a concave aspheric surface. The object-side surface 432 and the image-side surface 434 respectively have an inflection point.

The infrared rays filter 470 is made of glass, and between the third lens 430 and the image plane 480. The infrared rays filter 470 gives no contribution to the focal length of the system.

In the fourth embodiment, the first and the third lenses 410 and 430 are positive lenses, and their focal lengths are f1 and f3. The optical image capturing system of the fourth embodiment further satisfies ΣPP=f1+f3=10.08485 mm and f1/(f1+f3)=0.16231, where ΣPP is a sum of the focal lengths of each positive lens. It is helpful to share the positive refractive power of the first lens 410 to the other positive lens to avoid the significant aberration caused by the incident rays.

The optical image capturing system of the fourth embodiment further satisfies ΣNP=f2, where f2 is a focal length of the second lens 420, and ΣNP is a sum of the focal lengths of each negative lens.

The parameters of the lenses of the fourth embodiment are listed in Table 7 and Table 8.

TABLE 7

| f = 2.222 mm; f/HEP = 2.219; HAF = 38.940 deg; tan(HAF) = 0.8081 | | | | | | |
|---|---|---|---|---|---|---|
| Surface | | Radius of curvature (mm) | Thickness (mm) | Material | Refractive index | Abbe number | Focal length (mm) |
| 0 | Object | Plane | 600 | | | | |
| 1 | Aperture | Plane | −0.010 | | | | |
| 2 | 1st lens | 1.487055626 | 1.010 | Plastic | 1.515 | 56.55 | 1.637 |

TABLE 7-continued

| | | f = 2.222 mm; f/HEP = 2.219; HAF = 38.940 deg; tan(HAF) = 0.8081 | | | | | |
|---|---|---|---|---|---|---|---|
| Surface | | Radius of curvature (mm) | Thickness (mm) | Material | Refractive index | Abbe number | Focal length (mm) |
| 3 | | −1.505076076 | 0.249 | | | | |
| 4 | 2$^{nd}$ lens | −0.36069489 | 0.200 | Plastic | 1.642 | 22.46 | −2.919 |
| 5 | | −0.542912208 | 0.040 | | | | |
| 6 | 3$^{rd}$ lens | 1.281652065 | 0.810 | Plastic | 1.515 | 56.55 | 8.448 |
| 7 | | 1.424377095 | 0.171 | | | | |
| 8 | Infrared rays filter | Plane | 0.210 | BK7 SCHOTT | 1.517 | 64.13 | 1E+18 |
| 9 | | Plane | 0.493 | | | | |
| 10 | Image plane | Plane | | | | | |

Reference wavelength: 555 nm.

TABLE 8

Coefficients of the aspheric surfaces

| | Surface | | | | | |
|---|---|---|---|---|---|---|
| | 2 | 3 | 4 | 5 | 6 | 7 |
| k | −2.446993E+01 | −6.700702E−01 | −8.486171E−01 | −1.605246E+00 | −3.409242E+00 | −1.524673E−01 |
| A4 | 7.772577E−01 | −3.738105E−01 | 2.451188E+00 | 4.198877E−01 | −6.310128E−01 | −4.013282E−01 |
| A6 | −2.857170E+00 | 4.901229E−01 | −3.336054E+00 | 1.352835E−01 | 2.702612E−01 | 2.635780E−01 |
| A8 | 6.360286E+00 | −3.404526E+00 | 4.472075E+00 | −5.490369E−02 | 1.082885E+00 | −1.689917E−01 |
| A10 | −6.175832E+00 | 7.337168E+00 | 1.447504E+00 | −9.314438E−02 | −2.564719E+00 | 3.550490E−02 |
| A12 | 4.295691E+01 | 4.321632E+00 | −1.027384E+01 | −3.626370E−01 | −1.728103E+00 | 1.361830E−02 |
| A14 | −4.845727E+01 | −1.782020E+01 | 8.859950E+00 | −2.980852E−01 | 8.389525E+00 | −9.859487E−03 |
| A16 | 8.208770E+01 | 1.465540E+01 | 6.508666E−02 | 1.075243E+00 | −6.270638E+00 | 1.518319E−03 |
| A18 | 0.000000E+00 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 | 0.000000E+00 |

An equation of the aspheric surfaces of the fourth embodiment is the same as that of the first embodiment, and the definitions are the same as well.

The exact parameters of the fourth embodiment based on Table 7 and Table 8 are listed in the following table:

| Fourth embodiment (Reference wavelength: 555 nm) | | | | | |
|---|---|---|---|---|---|
| |f/f1| | |f/f2| | |f/f3| | |f1/f2| | |f2/f3| | TP1/TP2 |
| 1.35741 | 0.76128 | 0.26301 | 1.78305 | 2.89449 | 5.04875 |
| ΣPPR | ΣNPR | ΣPPR/|ΣNPR| | IN12/f | IN23/f | TP2/TP3 |
| 1.62042 | 0.76128 | 2.12853 | 0.11200 | 0.01798 | 0.24690 |
| TP2/(IN12 + TP2 + IN23) | | (TP1 + IN12)/TP2 | | (TP3 + IN23)/TP2 | |
| 0.40916 | | 4.24999 | | 4.24999 | |
| HOS | InTL | HOS/HOI | InS/HOS | |ODT| % | |TDT| % |
| 3.18300 | 2.30861 | 1.75469 | 0.99686 | 1.45247 | 1.20295 |
| HVT21 | HVT22 | HVT31 | HVT32 | HVT32/HOI | HVT32/HOS |
| 0.00000 | 0.00000 | 0.58264 | 0.95515 | 0.52654 | 0.30008 |
| PLTA | PSTA | NLTA | NSTA | SLTA | SSTA |
| −0.0020 mm | −0.0020 mm | 0.0045 mm | −0.0004 mm | 0.0051 mm | 0.0051 mm |

The results of the equations of the fourth embodiment based on Table 7 and Table 8 are listed in the following table:

| Values related to the inflection points of the fourth embodiment (Reference wavelength: 555 nm) | | | | | | | |
|---|---|---|---|---|---|---|---|
| HIF111 | 0.50734 | HIF111/HOI | 0.27968 | SGI111 | 0.08195 | |SGI111|/(|SGI111| + TP1) | 0.07507 |
| HIF211 | 0.50862 | HIF211/HOI | 0.28039 | SGI211 | −0.26503 | |SGI211|/(|SGI211| + TP2) | 0.20790 |
| HIF221 | 0.44481 | HIF221/HOI | 0.24521 | SGI221 | −0.14937 | |SGI221|/(|SGI221| + TP2) | 0.12887 |
| HIF311 | 0.31521 | HIF311/HOI | 0.17376 | SGI311 | 0.03156 | |SGI311|/(|SGI311| + TP3) | 0.03031 |
| HIF321 | 0.49162 | HIF321/HOI | 0.27101 | SGI321 | 0.06683 | |SGI321|/(|SGI321| + TP3) | 0.06208 |

The figures related to the profile curve lengths obtained based on Table 7 and Table 8 are listed in the following table:

| Fourth embodiment (Reference wavelength: 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.503 | 0.510 | 0.008 | 101.52% | 1.010 | 50.53% |
| 12 | 0.503 | 0.518 | 0.016 | 103.14% | 1.010 | 51.34% |
| 21 | 0.503 | 0.576 | 0.073 | 114.53% | 0.200 | 287.82% |
| 22 | 0.503 | 0.539 | 0.036 | 107.25% | 0.200 | 269.53% |
| 31 | 0.503 | 0.506 | 0.003 | 100.61% | 0.810 | 62.42% |
| 32 | 0.503 | 0.508 | 0.005 | 101.02% | 0.810 | 62.68% |
| ARS | EHD | ARS value | ARS − EHD | (ARS/EHD) % | TP | ARS/TP (%) |
| 11 | 0.582 | 0.593 | 0.011 | 101.92% | 1.010 | 58.76% |
| 12 | 0.772 | 0.872 | 0.100 | 112.99% | 1.010 | 86.40% |
| 21 | 0.764 | 0.896 | 0.132 | 117.33% | 0.200 | 447.96% |
| 22 | 0.816 | 0.873 | 0.057 | 106.97% | 0.200 | 436.42% |
| 31 | 0.875 | 0.945 | 0.070 | 108.00% | 0.810 | 116.71% |
| 32 | 1.450 | 1.538 | 0.088 | 106.06% | 0.810 | 189.83% |

Fifth Embodiment

Figure 5A:
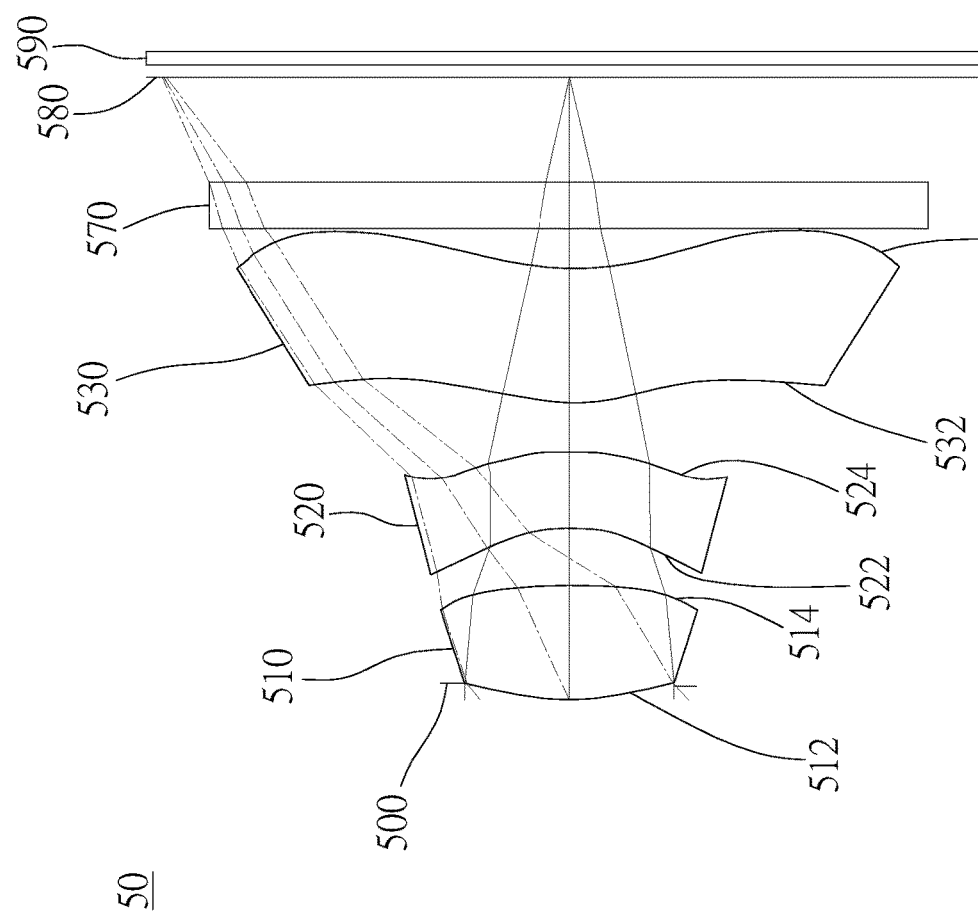
FIG. 5A is a schematic diagram of a fifth embodiment of the present invention.
Figure 5:
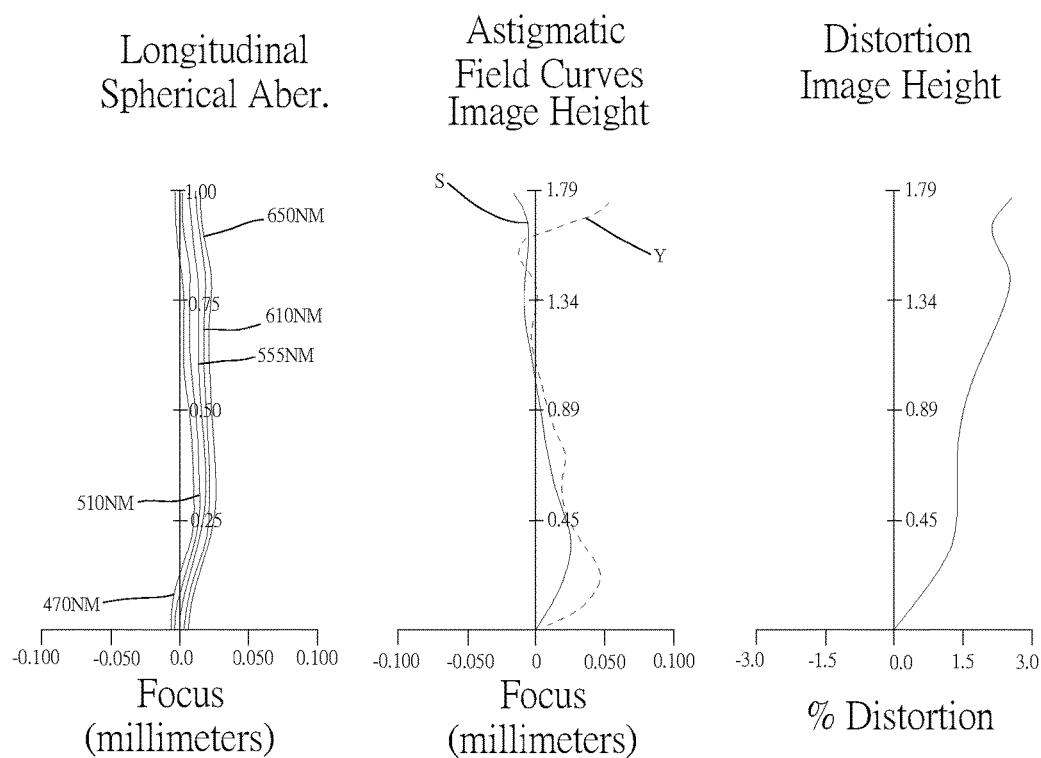
FIG. 5B shows curve diagrams of longitudinal spherical aberration, astigmatic field, and optical distortion of the optical image capturing system in the order from left to right of the fifth embodiment of the present application.
FIG. 5C shows a tangential fan and a sagittal fan of the optical image capturing system of the first embodiment of the present application, and a transverse aberration diagram at 0.7 field of view when a longest operation wavelength and a shortest operation wavelength pass through an edge of an aperture.
Figure 5:
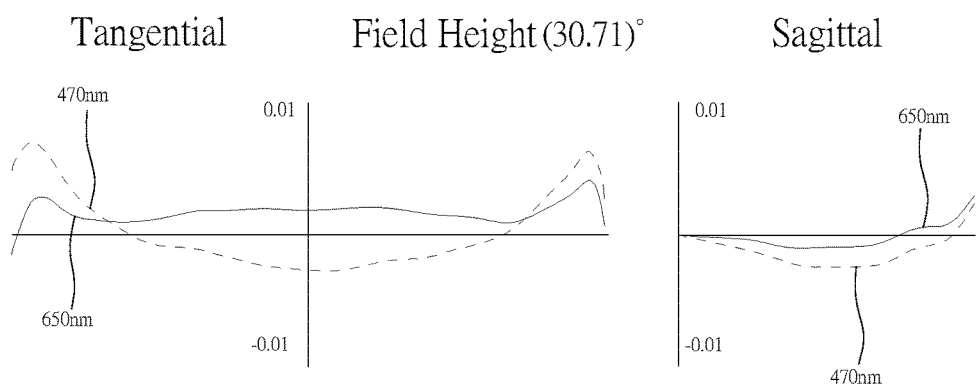

As shown in FIG. 5A and FIG. 5B, an optical image capturing system of the fifth embodiment of the present invention includes, along an optical axis from an object side to an image side, a first lens 510, an aperture 500, a second lens 520, a third lens 530, an infrared rays filter 570, an image plane 580, and an image sensor 590.

The first lens 510 has positive refractive power, and is made of plastic. An object-side surface 512, which faces the object side, is a convex aspheric surface, and an image-side surface 514, which faces the image side, is a convex aspheric surface. The object-side surface 512 has an inflection point.

The second lens 520 has negative refractive power, and is made of plastic. An object-side surface 522 thereof, which faces the object side, is a concave aspheric surface, and an image-side surface 524 thereof, which faces the image side, is a convex aspheric surface. The object-side surface 522 has two inflection points, and the image-side surface 524 has an inflection point.

The third lens 530 has positive refractive power, and is made of plastic. An object-side surface 532, which faces the object side, is a convex aspheric surface, and an image-side surface 534, which faces the image side, is a concave aspheric surface. The object-side surface 532 and the image-side surface 534 respectively have an inflection point thereon.

The infrared rays filter 570 is made of glass, and between the third lens 530 and the image plane 580. The infrared rays filter 570 gives no contribution to the focal length of the system.

In the fifth embodiment, the first and the third lenses 510 and 530 are positive lenses, and their focal lengths are f1 and f3. The optical image capturing system of the fifth embodiment further satisfies ΣPP=f1+f3=6.44941 mm and f1/(f1−f3)=0.28452, where f1 is a focal length of the first lens 510, f3 is a focal length of the third lens 530, and ΣPP is a sum of the focal lengths of each positive lens. It is helpful to share the positive refractive power of the first lens 510 to the other positive lens to avoid the significant aberration caused by the incident rays.

The optical image capturing system of the fifth embodiment further satisfies ΣNP=f2, where f2 is a focal length of the second lens 520, and ΣNP is a sum of the focal lengths of each negative lens.

The parameters of the lenses of the fifth embodiment are listed in Table 9 and Table 10.

TABLE 9 f = 2.057 mm; f/HEP = 2.24; HAF = 40.583 deg; tan(HAF) = 0.8566

| Surface | Radius of curvature (mm) | | Thickness (mm) | Material | Refractive index | Abbe number | Focal length (mm) |
|---|---|---|---|---|---|---|---|
| 0 | Object | Plane | Infinity | | | | |
| 1 | Aperture/1st lens | 1.256364462 | 0.512 | Plastic | 1.535 | 56.07 | 1.835 |
| 2 | | −3.896795751 | 0.257 | | | | |
| 3 | 2nd lens | −0.84968926 | 0.348 | Plastic | 1.642 | 22.46 | −3.346 |
| 4 | | −1.622564709 | 0.225 | | | | |
| 5 | 3rd lens | 0.855066254 | 0.596 | Plastic | 1.535 | 56.07 | 4.614 |
| 6 | | 0.988683392 | 0.184 | | | | |
| 7 | Filter | Plane | 0.210 | BK7 SCHOTT | 1.517 | 64.13 | |
| 8 | | Plane | 0.480 | | | | |
| 9 | Image plane | Plane | | | | | |

Reference wavelength: 555 nm

TABLE 10

Coefficients of the aspheric surfaces

| | Surface | | | | | |
|---|---|---|---|---|---|---|
| | 1 | 2 | 3 | 4 | 5 | 6 |
| k | −8.543668E−01 | −5.000000E+01 | 8.361153E−01 | −9.606588E+01 | −9.566282E+00 | −7.570904E−01 |
| A4 | −1.852370E−01 | −6.743225E−01 | −6.017233E+00 | −3.943839E+00 | −4.207809E−01 | −7.299115E−01 |
| A6 | 6.648515E+00 | −1.248606E+00 | 4.925600E+00 | 3.223536E+01 | 3.728905E−01 | 6.310904E−01 |
| A8 | −2.085146E+02 | 3.963763E+01 | −3.374586E+00 | −2.143038E+02 | 8.867358E−03 | −1.196737E−01 |
| A10 | 3.454832E+03 | −5.793885E+02 | −1.793678E+02 | 1.083792E+03 | 1.812797E−01 | −7.013291E−01 |
| A12 | −3.462627E+04 | 4.669191E+03 | 2.527606E+03 | −3.769143E+03 | −1.551975E+00 | 1.125515E+00 |
| A14 | 2.134099E+05 | −2.262385E+04 | −1.516711E+04 | 8.777716E+03 | 2.576755E+00 | −8.686918E−01 |
| A16 | −7.912456E+05 | 6.583015E+04 | 4.850963E+04 | −1.303191E+04 | −1.935997E+00 | 3.745895E−01 |
| A18 | 1.618173E+06 | −1.060853E+05 | −8.162442E+04 | 1.109631E+04 | 7.046488E−01 | −8.589537E−02 |
| A20 | −1.402923E+06 | 7.247224E+04 | 5.742924E+04 | −4.116041E+03 | −1.009718E−01 | 8.140552E−03 |

An equation of the aspheric surfaces of the fifth embodiment is the same as that of the first embodiment, and the definitions are the same as well.

The exact parameters of the fifth embodiment based on Table 9 and Table 10 are listed in the following table:

| Fifth embodiment (Reference wavelength: 555 nm) | | | | | |
|---|---|---|---|---|---|
| |f/f1| | |f/f2| | |f/f3| | |f1/f2| | |f2/f3| | TP1/TP2 |
| 1.12093 | 0.61474 | 0.44575 | 1.82341 | 1.37913 | 1.47186 |
| ΣPPR | ΣNPR | ΣPPR/|ΣNPR| | IN12/f | IN23/f | TP2/TP3 |
| 1.56667 | 0.61474 | 2.54850 | 0.12504 | 0.10949 | 0.58352 |
| TP2/(IN12 + TP2 + IN23) | | (TP1 + IN12)/TP2 | | (TP3 + IN23)/TP2 | |
| 0.41880 | | 2.36163 | | 2.36163 | |
| HOS | InTL | HOS/HOI | InS/HOS | |ODT| % | |TDT| % |
| 2.81113 | 1.93738 | 1.54969 | 0.97312 | 2.60266 | 0.76318 |
| HVT21 | HVT22 | HVT31 | HVT32 | HVT32/HOI | HVT32/HOS |
| 0.00000 | 0.61861 | 0.80106 | 1.01853 | 0.56148 | 0.36232 |
| PLTA | PSTA | NLTA | NSTA | SLTA | SSTA |
| 0.0025 mm | 0.0004 mm | 0.0048 mm | −0.0016 mm | 0.0024 mm | 0.0031 mm |

The results of the equations of the fifth embodiment based on Table 9 and Table 10 are listed in the following table:

| Values related to the inflection points of the fifth embodiment (Reference wavelength: 555 nm) | | | | | | | |
|---|---|---|---|---|---|---|---|
| HIF111 | 0.41602 | HIF111/HOI | 0.22934 | SGI111 | 0.06418 | |SGI111|/(|SGI111| + TP1) | 0.11146 |
| HIF211 | 0.44294 | HIF211/HOI | 0.24418 | SGI211 | −0.12767 | |SGI211|/(|SGI211| + TP2) | 0.19971 |
| HIF212 | 0.56901 | HIF212/HOI | 0.31368 | SGI212 | −0.19112 | |SGI212|/(|SGI212| + TP2) | 0.27195 |
| HIF221 | 0.43834 | HIF221/HOI | 0.24164 | SGI221 | −0.08154 | |SGI221|/(|SGI221| + TP2) | 0.13747 |
| HIF311 | 0.30887 | HIF311/HOI | 0.17027 | SGI311 | 0.04194 | |SGI311|/(|SGI311| + TP3) | 0.07576 |
| HIF321 | 0.43943 | HIF321/HOI | 0.24225 | SGI321 | 0.07588 | |SGI321|/(|SGI321| + TP3) | 0.12915 |

The figures related to the profile curve lengths obtained based on Table 9 and Table 10 are listed in the following table:

| Fifth embodiment (Reference wavelength: 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.459 | 0.467 | 0.008 | 101.67% | 0.512 | 91.23% |
| 12 | 0.459 | 0.465 | 0.005 | 101.19% | 0.512 | 90.80% |
| 21 | 0.459 | 0.485 | 0.026 | 105.58% | 0.348 | 139.45% |
| 22 | 0.459 | 0.471 | 0.012 | 102.54% | 0.348 | 135.44% |
| 31 | 0.459 | 0.465 | 0.006 | 101.32% | 0.596 | 78.09% |
| 32 | 0.459 | 0.468 | 0.008 | 101.84% | 0.596 | 78.49% |

-continued

| Fifth embodiment (Reference wavelength: 555 nm) | | | | | | |
|---|---|---|---|---|---|---|
| ARS | EHD | ARS value | ARS – EHD | (ARS/EHD) % | TP | ARS/TP (%) |
| 11 | 0.459 | 0.467 | 0.008 | 101.67% | 0.512 | 91.23% |
| 12 | 0.569 | 0.588 | 0.020 | 103.43% | 0.512 | 114.99% |
| 21 | 0.593 | 0.633 | 0.040 | 106.80% | 0.348 | 182.16% |
| 22 | 0.716 | 0.735 | 0.019 | 102.67% | 0.348 | 211.39% |
| 31 | 1.302 | 1.313 | 0.011 | 100.83% | 0.596 | 220.41% |
| 32 | 1.579 | 1.738 | 0.159 | 110.04% | 0.596 | 291.72% |

Sixth Embodiment

Figure 6A:
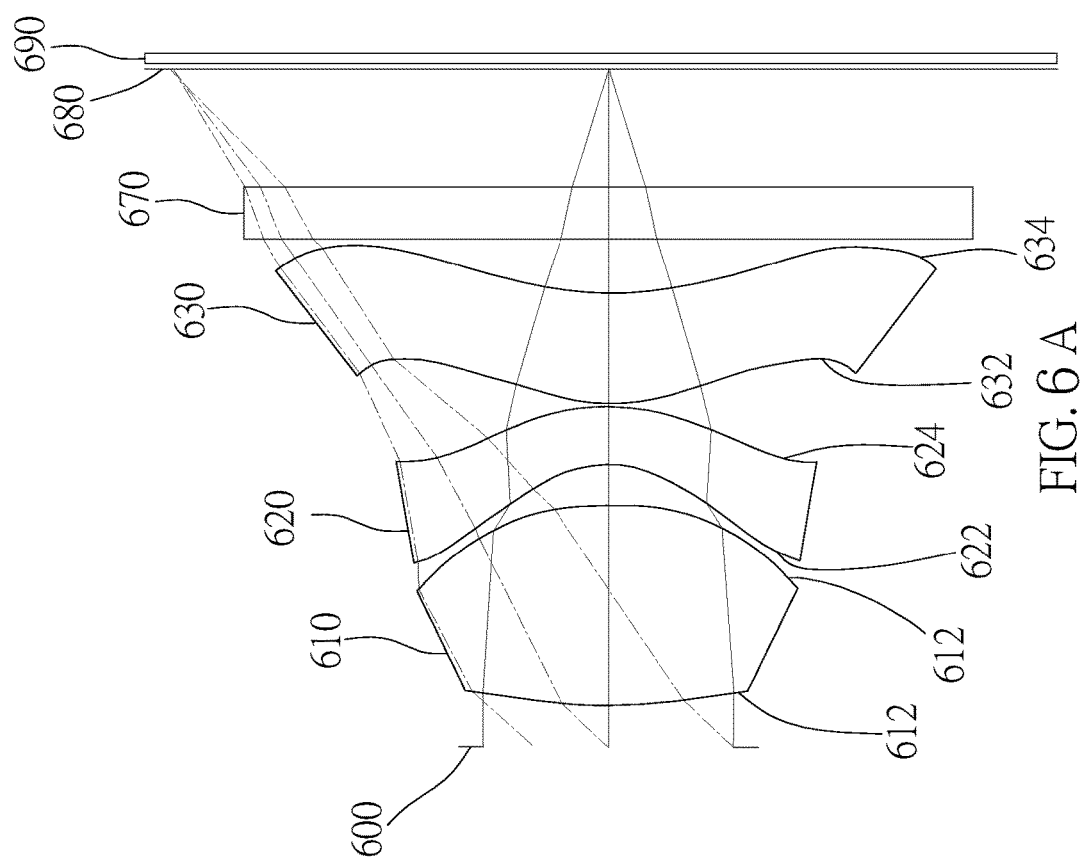
FIG. 6A is a schematic diagram of a sixth embodiment of the present invention.
Figure 6:
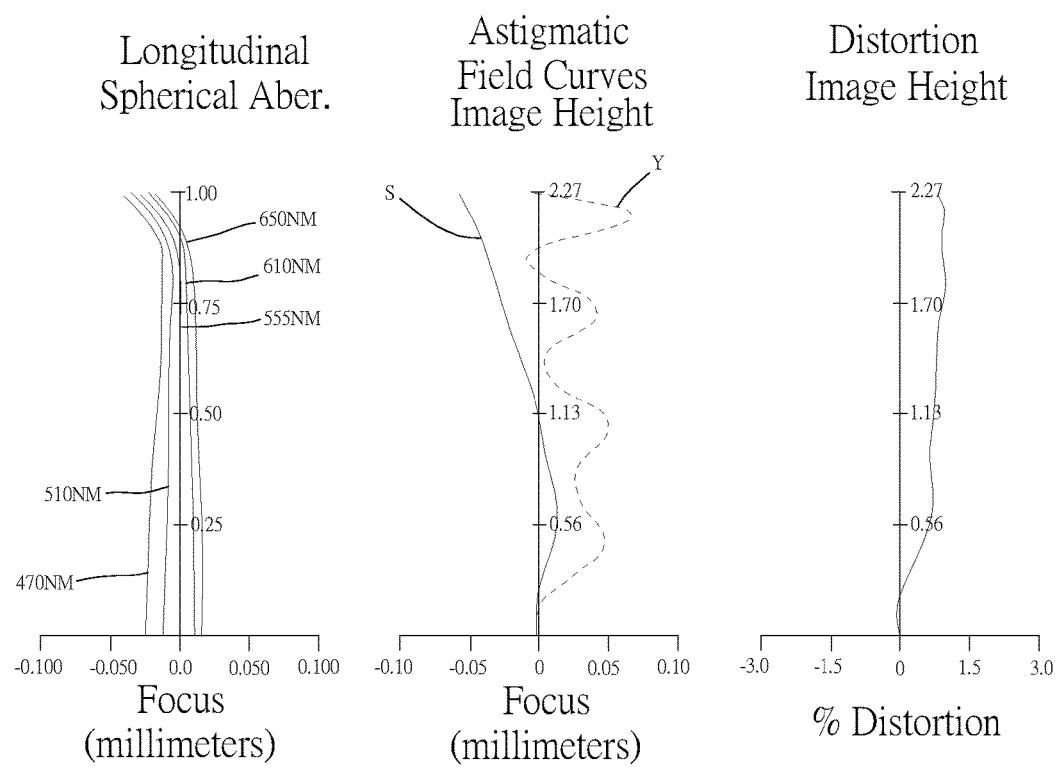
FIG. 6B shows curve diagrams of longitudinal spherical aberration, astigmatic field, and optical distortion of the optical image capturing system in the order from left to right of the sixth embodiment of the present application.
FIG. 6C shows a tangential fan and a sagittal fan of the optical image capturing system of the first embodiment of the present application, and a transverse aberration diagram at 0.7 field of view when a longest operation wavelength and a shortest operation wavelength pass through an edge of an aperture.
Figure 6:
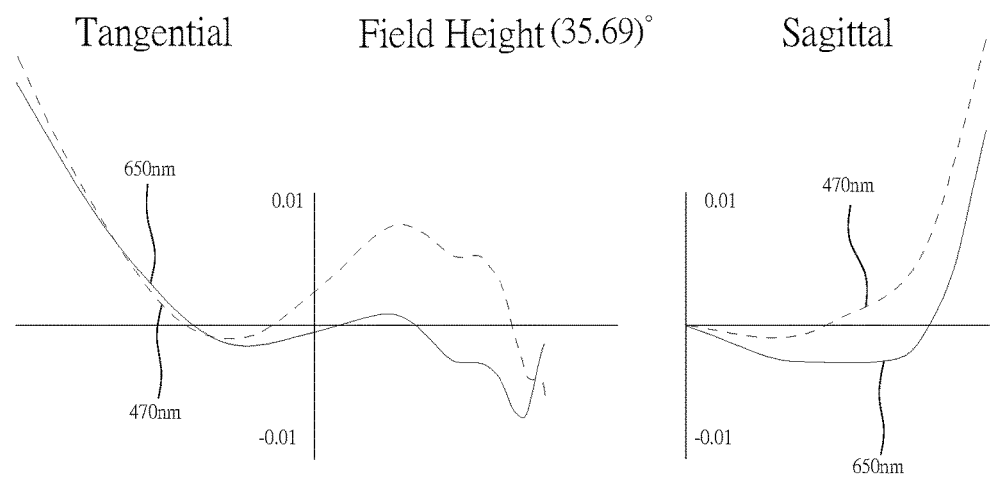

As shown in FIG. 6A and FIG. 6B, an optical image capturing system of the sixth embodiment of the present invention includes, along an optical axis from an object side to an image side, an aperture 600, a first lens 610, a second lens 620, a third lens 630, an infrared rays filter 670, an image plane 680, and an image sensor 690.

The first lens 610 has positive refractive power, and is made of plastic. An object-side surface 612, which faces the object side, is a convex aspheric surface, and an image-side surface 614, which faces the image side, is a convex aspheric surface. The object-side surface 612 has an inflection point.

The second lens 620 has negative refractive power, and is made of plastic. An object-side surface 622 thereof, which faces the object side, is a concave aspheric surface, and an image-side surface 624 thereof, which faces the image side, is a convex aspheric surface. The object-side surface 622 and the image-side surface 624 respectively have an inflection point.

The third lens 630 has positive refractive power, and is made of plastic. An object-side surface 632, which faces the object side, is a convex aspheric surface, and an image-side surface 634, which faces the image side, is a concave aspheric surface. The object-side surface 632 and the image-side surface 634 respectively have an inflection point.

The infrared rays filter 670 is made of glass, and between the third lens 630 and the image plane 680. The infrared rays filter 670 gives no contribution to the focal length of the system.

In the sixth embodiment, the first and the third lenses 610 and 630 are positive lenses, and their focal lengths are f1 and f3. The optical image capturing system of the sixth embodiment further satisfies $\Sigma PP = f1 + f3 = 4.0907$ mm and $f1/(f1+f3) = 0.4377$, where f1 is a focal length of the first lens 610, f3 is a focal length of the third lens 630, and $\Sigma PP$ is a sum of the focal lengths of each positive lens. It is helpful to share the positive refractive power of the first lens 610 to the other positive lens to avoid the significant aberration caused by the incident rays.

The optical image capturing system of the sixth embodiment further satisfies $\Sigma NP = f3$, where $\Sigma NP$ is a sum of the focal lengths of each negative lens.

The parameters of the lenses of the sixth embodiment are listed in Table 11 and Table 12.

TABLE 11

| f = 2.334 mm; f/HEP = 1.8; HAF = 43.934 deg; tan(HAF) = 0.9635 | | | | | | |
|---|---|---|---|---|---|---|
| Surface | | Radius of curvature (mm) | Thickness (mm) | Material | Refractive index | Abbe number | Focal length (mm) |
| 0 | Object | plane | 6000 | | | | |
| 1 | Aperture | plane | 0.245 | | | | |
| 2 | 1$^{st}$ lens | 2.273980 | 1.187 | plastic | 1.544 | 56.09 | 1.791 |
| 3 | | −1.398300 | 0.234 | | | | |
| 4 | 2$^{nd}$ lens | −0.424004 | 0.338 | plastic | 1.642 | 22.46 | −1.706 |
| 5 | | −0.903506 | 0.025 | | | | |
| 6 | 3$^{rd}$ lens | 0.863493 | 0.646 | plastic | 1.642 | 22.46 | 2.300 |
| 7 | | 1.450258 | 0.326 | | | | |
| 8 | Infrared rays filter | plane | 0.300 | | 1.517 | 64.13 | |
| 9 | | plane | 0.700 | | | | |
| 10 | Image plane | plane | | | | | |

Reference wavelength: 555 nm; Position of blocking light: blocking at the third surface with effective semi diameter of 0.980 mm

TABLE 12

| Coefficients of the aspheric surfaces | | | | | | |
|---|---|---|---|---|---|---|
| | Surface | | | | | |
| | 2 | 3 | 4 | 5 | 6 | 7 |
| k | −5.793298E+01 | −1.047222E+01 | −2.214799E+00 | −1.609407E+00 | −1.279016E+00 | −5.974452E+00 |
| A4 | 5.680888E−01 | −3.906179E−01 | 7.450205E−01 | 3.279455E−01 | −7.661874E−01 | 7.677749E−02 |
| A6 | −2.795876E+00 | −2.002429E−01 | −6.574821E+00 | −8.799316E−01 | 1.625831E+00 | −1.684057E−01 |

TABLE 12-continued

Coefficients of the aspheric surfaces

| | Surface | | | | | |
|---|---|---|---|---|---|---|
| | 2 | 3 | 4 | 5 | 6 | 7 |
| A8 | 1.063340E+01 | −6.185052E−01 | 2.106066E+01 | 4.139075E−01 | −2.860513E+00 | 1.039362E−01 |
| A10 | −2.849055E+01 | 4.623426E+00 | −3.528569E+01 | 3.660140E+00 | 3.247167E+00 | −1.815849E−02 |
| A12 | 4.688333E+01 | −7.602169E+00 | 3.509519E+01 | −8.188023E+00 | −2.233218E+00 | −1.486964E−02 |
| A14 | −4.319063E+01 | 5.161391E+00 | −2.125517E+01 | 7.720120E+00 | 8.403317E−01 | 9.981753E−03 |
| A16 | 1.663827E+01 | −1.295352E+00 | 7.457267E+00 | −3.562241E+00 | −1.320160E−01 | −2.377427E−03 |
| A18 | 0.000000E+00 | 0.000000E+00 | −1.193774E+00 | 6.639228E−01 | −6.379427E−04 | 2.051198E−04 |
| A20 | | | | | | |

An equation of the aspheric surfaces of the sixth embodiment is the same as that of the first embodiment, and the definitions are the same as well.

The exact parameters of the sixth embodiment based on Table 11 and Table 12 are listed in the following table:

| Sixth embodiment (Reference wavelength: 555 nm) | | | | | |
|---|---|---|---|---|---|
| \|f/f1\| | \|f/f2\| | \|f/f3\| | \|f1/f2\| | \|f2/f3\| | TP1/TP2 |
| 1.30350 | 1.36818 | 1.01473 | 0.95272 | 1.34831 | 3.51422 |
| ΣPPR | ΣNPR | ΣPPR/\|ΣNPR\| | IN12/f | IN23/f | TP2/TP3 |
| 2.31823 | 1.36818 | 1.69439 | 0.10018 | 0.01071 | 0.52282 |
| TP2/(IN12 + TP2 + IN23) | | (TP1 + IN12)/TP2 | | (TP3 + IN23)/TP2 | |
| 0.56614 | | 1.98672 | | 1.98672 | |
| HOS | InTL | HOS/HOI | InS/HOS | \|ODT\| % | \|TDT\| % |
| 3.75481 | 2.42939 | 1.65556 | 1.06530 | 1.08812 | 0.25449 |
| HVT21 | HVT22 | HVT31 | HVT32 | HVT32/HOI | HVT32/HOS |
| 0.00000 | 1.04568 | 1.06733 | 1.32084 | 0.58238 | 0.35177 |
| PLTA | PSTA | NLTA | NSTA | SLTA | SSTA |
| −0.0053 mm | −0.0013 mm | 0.0198 mm | 0.0180 mm | 0.0205 mm | 0.0134 mm |

The results of the equations of the sixth embodiment based on Table 11 and Table 12 are listed in the following table:

| Values related to the inflection points of the sixth embodiment (Reference wavelength: 555 nm) | | | | | | | |
|---|---|---|---|---|---|---|---|
| HIF111 | 0.5566 | HIF111/HOI | 0.2454 | SGI111 | 0.0630 | \|SGI111\|/(\|SGI111\| + TP1) | 0.0504 |
| HIF211 | 0.6152 | HIF211/HOI | 0.2713 | SGI211 | −0.3185 | \|SGI211\|/(\|SGI211\| + TP2) | 0.4853 |
| HIF221 | 0.6419 | HIF221/HOI | 0.2830 | SGI221 | −0.1904 | \|SGI221\|/(\|SGI221\| + TP2) | 0.3606 |
| HIF311 | 0.5698 | HIF311/HOI | 0.2512 | SGI311 | 0.1351 | \|SGI311\|/(\|SGI311\| + TP3) | 0.1730 |
| HIF321 | 0.7070 | HIF321/HOI | 0.3117 | SGI321 | 0.1430 | \|SGI321\|/(\|SGI321\| + TP3) | 0.1813 |

The figures related to the profile curve lengths obtained based on Table 11 and Table 12 are listed in the following table:

| Sixth embodiment (Reference wavelength: 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.648 | 0.654 | 0.006 | 100.88% | 1.187 | 55.12% |
| 12 | 0.648 | 0.684 | 0.035 | 105.47% | 1.187 | 57.63% |
| 21 | 0.648 | 0.749 | 0.100 | 115.48% | 0.338 | 221.73% |
| 22 | 0.648 | 0.683 | 0.034 | 105.30% | 0.338 | 202.20% |
| 31 | 0.648 | 0.671 | 0.023 | 103.54% | 0.646 | 103.95% |
| 32 | 0.648 | 0.663 | 0.014 | 102.19% | 0.646 | 102.58% |
| ARS | EHD | ARS value | ARS − EHD | (ARS/EHD) % | TP | ARS/TP (%) |
| 11 | 0.795 | 0.802 | 0.007 | 100.84% | 1.187 | 67.58% |
| 12 | 1.014 | 1.207 | 0.193 | 119.01% | 1.187 | 101.71% |
| 21 | 1.035 | 1.207 | 0.172 | 116.59% | 0.338 | 357.34% |
| 22 | 1.108 | 1.167 | 0.059 | 105.35% | 0.338 | 345.52% |

-continued

| Sixth embodiment (Reference wavelength: 555 nm) | | | | | | |
|---|---|---|---|---|---|---|
| 31 | 1.311 | 1.393 | 0.082 | 106.29% | 0.646 | 215.67% |
| 32 | 1.785 | 1.897 | 0.111 | 106.24% | 0.646 | 293.62% |

It must be pointed out that the embodiments described above are only some embodiments of the present invention. All equivalent structures which employ the concepts disclosed in this specification and the appended claims should fall within the scope of the present invention.

What is claimed is:

1. An optical image capturing system, which is composed of a first lens, a second lens, a third lens, and an image plane, in order along an optical axis from an object side to an image side, wherein the first lens has refractive power; the second lens has refractive power; and the third lens has refractive power;
   wherein the optical image capturing system consists of the three lenses with refractive power; at least one lens among the first to the third lenses has positive refractive power; the third lens has an object-side surface, which faces the object side, and an image-side surface, which faces the image side, and both the object-side surface and the image-side surface of the third lens are aspheric surfaces;
   wherein the optical image capturing system satisfies:

$1.2 < f/HEP < 6.0$;

$0.5 < HOS/f < 3.0$;

$0 < InTL/HOS < 0.9$; and $1 < 2(ARE/HEP) < 1.5$;

where f1, f2 and f3 are focal lengths of the first lens to the third lens, respectively; f is a focal length of the optical image capturing system; HEP is an entrance pupil diameter of the optical image capturing system; HOS is a distance in parallel with the optical axis from an object-side surface of the first lens to the image plane; InTL is a distance from the object-side surface of the first lens to the image-side surface of the third lens; for any surface of the first lens to the third lens, ARE is a profile curve length measured from a start point where the optical axis passes therethrough, along a surface profile thereof, and finally to a coordinate point of a perpendicular distance where is a half of the entrance pupil diameter away from the optical axis;
   wherein the second lens has an object-side surface, which faces the object side, and an image-side surface, which faces the image side: the object-side surface of the second lens has at least one inflection point;
   wherein the optical image capturing system further satisfies:

$PLTA < 20$ μm;

$PSTA < 20$ μm;

$NLTA < 20$ μm;

$NSTA < 20$ μm;

$SLTA < 20$ μm:

$SSTA < 20$ μm; and $ITDTI < 60\%$;

where TDT is a TV distortion; HOI is a height for image formation perpendicular to the optical axis on the image plane; PLTA is a transverse aberration at 0.7 HOI on the image plane in the positive direction of a tangential fan of the optical image capturing system after a longest operation wavelength passing through an edge of the aperture; PSTA is a transverse aberration at 0.7 HOI on the image plane in the positive direction of the tangential fan after a shortest operation wavelength passing through the edge of the aperture; NLTA is a transverse aberration at 0.7 HOI on the image plane in the negative direction of the tangential fan after the longest operation wavelength passing through the edge of the aperture; NSTA is a transverse aberration at 0.7 HOI on the image plane in the negative direction of the tangential fan after the shortest operation wavelength passing through the edge of the aperture; SLTA is a transverse aberration at 0.7 HOI on the image plane of a sagittal fan of the optical image capturing system after the longest operation wavelength passing through the edge of the aperture; SSTA is a transverse aberration at 0.7 HOI on the image plane of a sagittal fan after the shortest operation wavelength passing through the edge of the aperture.

2. The optical image capturing system of claim 1, wherein the optical image capturing system further satisfies:

$1 \leq ARS/EHD \leq 1.5$;

where, for any surface of the first lens to the third lens, EHD is a maximum effective half diameter thereof, ARS is a profile curve length measured from a start point where the optical axis passes therethrough, along a surface profile thereof, and finally to an end point of the maximum effective half diameter thereof.

3. The optical image capturing system of claim 1, wherein the optical image capturing system further satisfies:

$0\ mm < HOS \leq 10\ mm$.

4. The optical image capturing system of claim 1, wherein the optical image capturing system further satisfies:

$0\ deg < HAF \leq 70\ deg$;

where HAF is a half of a view angle of the optical image capturing system.

5. The optical image capturing system of claim 1, wherein the optical image capturing system further satisfies:

$0.5 \leq ARE31/TP3 \leq 10$; and $0.5 \leq ARE32/TP3 \leq 10$;

where ARE31 is a profile curve length measured from a start point where the optical axis passes the object-side surface of the third lens, along a surface profile of the object-side surface of the third lens, and finally to a coordinate point of a perpendicular distance where is a half of the entrance pupil diameter away from the optical axis; ARE32 is a profile curve length measured from a start point where the optical axis passes the image-side surface of the third lens, along a surface profile of the image-side surface of the third lens, and finally to a coordinate point of a perpendicular distance where is a half of the entrance pupil diameter away from the optical axis; TP3 is a thickness of the third lens on the optical axis.

6. The optical image capturing system of claim 1, wherein the optical image capturing system further satisfies:

$$0.5 \leq ARE21/TP2 \leq 10; \text{ and}$$

$$0.5 \leq ARE22/TP2 \leq 10;$$

where ARE21 is a profile curve length measured from a start point where the optical axis passes the object-side surface of the second lens, along a surface profile of the object-side surface of the second lens, and finally to a coordinate point of a perpendicular distance where is a half of the entrance pupil diameter away from the optical axis; ARE22 is a profile curve length measured from a start point where the optical axis passes the image-side surface of the second lens, along a surface profile of the image-side surface of the second lens, and finally to a coordinate point of a perpendicular distance where is a half of the entrance pupil diameter away from the optical axis; TP2 is a thickness of the second lens on the optical axis.

7. The optical image capturing system of claim 1, wherein the second lens has negative refractive power, and the third lens has positive refractive power.

8. The optical image capturing system of claim 1, further comprising an aperture, wherein the optical image capturing system further satisfies:

$$0.5 \leq InS/HOS \leq 1.1;$$

where InS is a distance in parallel with the optical axis between the aperture and the image plane.

9. An optical image capturing system, which is composed of a first lens, a second lens, a third lens, and an image plane, in order along an optical axis from an object side to an image side, wherein
the first lens has positive refractive power;
the second lens has refractive power; and
the third lens has refractive power;
wherein the optical image capturing system consists of the three lenses with refractive power; at least a surface of each of at least two lenses among the first to the third lenses has at least an inflection point; at least one lens between the second and the third lenses has positive refractive power; the third lens has an object-side surface, which faces the object side, and an image-side surface, which faces the image side, and both the object-side surface and the image-side surface of the third lens are aspheric surfaces;
wherein the optical image capturing system satisfies:

$$1.2 < f4/HEP < 6.0;$$

$$0.5 < HOS/f < 3.0;$$

$$0 < InTL/HOS < 0.9; \text{ and}$$

$$1 < 2(ARE/HEP) < 1.5;$$

where f1, f2 and f3 are focal lengths of the first lens to the third lens, respectively; f is a focal length of the optical image capturing system; HEP is an entrance pupil diameter of the optical image capturing system; HOS is a distance in parallel with the optical axis between an object-side surface, which face the object side, of the first lens and the image plane; InTL is a distance from the object-side surface of the first lens to the image-side surface of the third lens; for any surface of the first lens to the third lens, ARE is a profile curve length measured from a start point where the optical axis passes therethrough, along a surface profile thereof, and finally to a coordinate point of a perpendicular distance where is a half of the entrance pupil diameter away from the optical axis;
wherein the second lens has an object-side surface, which faces the object side, and an image-side surface, which faces the image side; the object-side surface of the second lens has at least one inflection point;
wherein the optical image capturing system further satisfies:

$$PLTA < 20 \text{ um};$$

$$PSTA < 20 \text{ um};$$

$$NLTA < 20 \text{ um};$$

$$NSTA < 20 \text{ um};$$

$$SLTA < 20 \text{ um};$$

$$SSTA < 20 \text{ um}; \text{ and}$$

$$ITDT < 60\%;$$

where TDT is a TV distortion; HOI is a height for image formation perpendicular to the optical axis on the image plane; PLTA is a transverse aberration at 0.7 HOI on the image plane in the positive direction of a tangential fan of the optical image capturing system after a longest operation wavelength passing through an edge of the aperture; PSTA is a transverse aberration at 0.7 HOI on the image plane in the positive direction of the tangential fan after a shortest operation wavelength passing through the edge of the aperture; NLTA is a transverse aberration at 0.7 HOI on the image plane in the negative direction of the tangential fan after the longest operation wavelength passing through the edge of the aperture: NSTA is a transverse aberration at 0.7 HOI on the image plane in the negative direction of the tangential fan after the shortest operation wavelength passing through the edge of the aperture; SLTA is a transverse aberration at 0.7 HOI on the image plane of a sagittal fan of the optical image capturing system after the longest operation wavelength passing through the edge of the aperture; SSTA is a transverse aberration at 0.7 HOI on the image plane of a sagittal fan after the shortest operation wavelength passing through the edge of the aperture.

10. The optical image capturing system of claim 9, wherein the optical image capturing system further satisfies:

$$1 \leq ARS/EHD \leq 1.5;$$

where, for any surface of the first lens to the third lens, EHD is a maximum effective half diameter thereof, ARS is a profile curve length measured from a start point where the optical axis passes therethrough, along a surface profile thereof, and finally to an end point of the maximum effective half diameter thereof.

11. The optical image capturing system of claim 9, wherein the third lens has positive refractive power, and at least a surface among the object-side surface and the image-side surface thereof has at least an inflection point.

12. The optical image capturing system of claim 9, wherein the optical image capturing system further satisfies:

$$PLTA \leq 10 \text{ μm};$$

$$PSTA \leq 10 \text{ μm};$$

$$NLTA \leq 10 \text{ μm};$$

$NSTA \leq 10$ μm;

$SLTA \leq 10$ μm; and $SSTA \leq 10$ μm.

13. The optical image capturing system of claim 9, wherein the second lens has negative refractive power.

14. The optical image capturing system of claim 9, wherein the optical image capturing system further satisfies:

$0 < IN12/f \leq 0.25$;

where IN12 is a distance on the optical axis between the first lens and the second lens.

15. The optical image capturing system of claim 9, wherein the optical image capturing system further satisfies:

$0 < IN23/f \leq 0.8$;

where IN23 is a distance on the optical axis between the second lens and the third lens.

16. The optical image capturing system of claim 9, wherein the optical image capturing system further satisfies:

$1 \leq (TP3+IN23)/TP2 \leq 10$;

where IN23 is a distance on the optical axis between the second lens and the third lens; TP2 is a thickness of the second lens on the optical axis; TP3 is a thickness of the third lens on the optical axis.

17. The optical image capturing system of claim 9, wherein the optical image capturing system further satisfies:

$1 \leq (TP1+IN12)/TP2 \leq 10$;

where IN12 is a distance on the optical axis between the first lens and the second lens; TP1 is a thickness of the first lens on the optical axis; TP2 is a thickness of the second lens on the optical axis.

18. The optical image capturing system of claim 9, wherein the optical image capturing system further satisfies:

$0 < Tp2/(IN12+TP2+IN23) < 1$;

where TP2 is a thickness of the second lens on the optical axis; IN12 is a distance on the optical axis between the first lens and the second lens; IN23 is a distance on the optical axis between the second lens and the third lens.

19. An optical image capturing system, which is composed of a first lens, a second lens, a third lens, and an image plane, in order along an optical axis from an object side to an image side, wherein
the first lens has positive refractive power;
the second lens has negative refractive power; and
the third lens as refractive power, wherein the third lens has at least an inflection point on at least one surface among an object-side surface, which faces the object side, and an image-side surface, which faces the image side, thereof;
wherein the optical image capturing system consists of the three lenses having refractive power; at least a surface of each lens among the first lens to the second lens has at least an inflection point thereon; both an object-side surface, which faces the object side, and an image-side surface, which faces the image side, of the second lens are aspheric surfaces; both the object-side surface and the image-side surface of the third lens are aspheric surfaces; wherein the optical image capturing system satisfies:

$1.2 < f/HEP < 3.5$;

$0.4 < |\tan(HAF)| < 1.5$;

$0.5 < HOS/f < 2.5$;

$0 < InTL/HOS < 0.9$; and $1 < 2(ARE/HEP) < 1.5$;

where f1, f2 and f3 are focal lengths of the first lens to the third lens, respectively; f is a focal length of the optical image capturing system; HEP is an entrance pupil diameter of the optical image capturing system; HAF is a half of a view angle of the optical image capturing system; HOS is a distance in parallel with the optical axis between an object-side surface, which face the object side, of the first lens and the image plane; InTL is a distance from the object-side surface of the first lens to the image-side surface of the third lens; for any surface of the first lens to the third lens, ARE is a profile curve length measured from a start point where the optical axis passes therethrough, along a surface profile thereof, and finally to a coordinate point of a perpendicular distance where is a half of the entrance pupil diameter away from the optical axis;

wherein the second lens has an object-side surface, which faces the object side, and an image-side surface, which faces the image side; the object-side surface of the second lens has at least one inflection point;

wherein the optical image capturing system further satisfies:

$PLTA < 20$ μm;

$PSTA < 20$ μm;

$NLTA < 20$ μm;

$NSTA < 20$ μm;

$SLTA < 20$ μm;

$SSTA < 20$ μm; and $ITDTI < 60\%$;

where TDT is a TV distortion; HOI is a height for image formation perpendicular to the optical axis on the image plane; PLTA is a transverse aberration at 0.7 HOI on the image plane in the positive direction of a tangential fan of the optical image capturing system after a longest operation wavelength passing through an edge of the aperture; PSTA is a transverse aberration at 0.7 HOI on the image plane in the positive direction of the tangential fan after a shortest operation wavelength passing through the edge of the aperture; NLTA is a transverse aberration at 0.7 HOI on the image plane in the negative direction of the tangential fan after the longest operation wavelength passing through the edge of the aperture; NSTA is a transverse aberration at 0.7 HOI on the image plane in the negative direction of the tangential fan after the shortest operation wavelength passing through the edge of the aperture; SLTA is a transverse aberration at 0.7 HOI on the image plane of a sagittal fan of the optical image capturing system after the longest operation wavelength passing through the edge of the aperture; SSTA is a transverse aberration at 0.7 HOI on the image plane of a sagittal fan after the shortest operation wavelength passing through the edge of the aperture.

20. The optical image capturing system of claim 19, wherein the optical image capturing system further satisfies:

$1 \leq ARS/EHD \leq 1.5$;

where, for any surface of the first lens to the third lens, EHD is a maximum effective half diameter thereof, ARS is a profile curve length measured from a start point where the optical axis passes therethrough, along a surface profile thereof, and finally to an end point of the maximum effective half diameter thereof.

21. The optical image capturing system of claim 19, wherein the optical image capturing system further satisfies:

$0\text{ mm} < HOS \leq 10 \text{ mm}.$

22. The optical image capturing system of claim 19, wherein the optical image capturing system further satisfies:

$0.5 \leq ARE31/TP3 \leq 10;$ and $0.5 \leq ARE32/TP3 \leq 10;$ where ARE31 is a profile curve length measured from a start point where the optical axis passes the object-side surface of the third lens, along a surface profile of the object-side surface of the third lens, and finally to a coordinate point of a perpendicular distance where is a half of the entrance pupil diameter away from the optical axis; ARE32 is a profile curve length measured from a start point where the optical axis passes the image-side surface of the third lens, along a surface profile of the image-side surface of the third lens, and finally to a coordinate point of a perpendicular distance where is a half of the entrance pupil diameter away from the optical axis; TP3 is a thickness of the third lens on the optical axis.

23. The optical image capturing system of claim 19, wherein the optical image capturing system further satisfies:

$0.5 \leq ARE21/TP2 \leq 10;$ and $0.5 \leq ARE22/TP2 \leq 10;$ where ARE21 is a profile curve length measured from a start point where the optical axis passes the object-side surface of the second lens, along a surface profile of the object-side surface of the second lens, and finally to a coordinate point of a perpendicular distance where is a half of the entrance pupil diameter away from the optical axis; ARE22 is a profile curve length measured from a start point where the optical axis passes the image-side surface of the second lens, along a surface profile of the image-side surface of the second lens, and finally to a coordinate point of a perpendicular distance where is a half of the entrance pupil diameter away from the optical axis; TP2 is a thickness of the second lens on the optical axis.

24. The optical image capturing system of claim 19, further comprising an aperture an image sensor, and a driving module, wherein the image sensor is disposed on the image plane; the driving module is coupled with the lenses to move the lenses; the optical image capturing system further satisfies:

$0.5 \leq InS/HOS \leq 1.1;$ where InS is a distance in parallel with the optical axis between the aperture and the image plane.

* * * * *